(12) United States Patent
Serizawa et al.

(10) Patent No.: US 6,219,321 B1
(45) Date of Patent: Apr. 17, 2001

(54) DATA RECORDING APPARATUS AND METHOD

(75) Inventors: Makoto Serizawa, Takatsuki; Takane Chuma, Hirakata, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/164,778

(22) Filed: Oct. 1, 1998

(30) Foreign Application Priority Data

Oct. 3, 1997 (JP) ................................................ 9-271530

(51) Int. Cl.[7] ...................................................... G11B 7/00
(52) U.S. Cl. ........................... 369/59; 369/60.01; 369/54; 369/47
(58) Field of Search .................................. 369/47, 48, 49, 369/50, 54, 58, 59, 60.01

(56) References Cited

U.S. PATENT DOCUMENTS 5,587,978 * 12/1996 Endo et al. ....................... 369/49 X
5,793,724 * 8/1998 Ichikawa et al. .................. 369/59 X
5,798,995 * 8/1998 Fukushima et al. ............... 369/58 X

* cited by examiner

Primary Examiner—Muhammad Edun
(74) Attorney, Agent, or Firm—Wenderoth, Lind & Ponack, L.L.P.

(57) ABSTRACT

A recorded state monitoring portion 4 monitors a state where a recording instruction to a storage device 1 is executed. A recording managing portion 3 judges whether or not the result of the monitoring by the recorded state monitoring portion 4 satisfies a predetermined condition, to issue the recording instruction to the storage device 1 when the result of the judgment is affirmative, while issuing a recording instruction to an auxiliary storage device 2 when it is negative. Data continuously fed are recorded upon being shared between the storage device 1 and the auxiliary storage device 2, so that the apparent recording speed is equal to the sum of the recording speed of the storage device 1 and the recording speed of the auxiliary storage device 2, thereby making higher-speed recording possible.

33 Claims, 21 Drawing Sheets

FIG. 18(a)

| | POSITION PART | DATA SIZE PART | DATA BUFFER PART |
|---|---|---|---|
| ENTRY 0 | 0 | 16384 | ⋮ |
| ENTRY 1 | 16384 | 16384 | ⋮ |
| ENTRY 2 | 65536 | 16384 | ⋮ |
| ⋯ | ⋯ | ⋯ | ⋯ |
| ENTRY K-1 | 1048576 | 6400 | ⋮ |
| ENTRY K | 32768 | 16384 | ⋮ |
| ⋯ | ⋯ | ⋯ | ⋯ |
| ENTRY N | 0 | 0 | ⋮ |

FIG. 18(b)

| | POSITION PART | DATA SIZE PART | DATA BUFFER PART |
|---|---|---|---|
| ENTRY 0 | 32768 | 16384 | ⋮ |
| ENTRY 1 | 49152 | 16384 | ⋮ |
| ⋯ | ⋯ | ⋯ | ⋯ |
| ENTRY M | 1032192 | 16384 | ⋮ |
| ENTRY M+1 | 0 | 0 | ⋮ |

FIG. 19

| | POSITION PART | DATA SIZE PART | DATA BUFFER PART |
|---|---|---|---|
| ENTRY 0 | 0 | 16384 | ... |
| ENTRY 1 | 16384 | 16384 | ... |
| ENTRY 2 | 32768 | 0 | ... |
| ENTRY 3 | 49152 | 0 | ... |
| ENTRY 4 | 65536 | 16384 | ... |
| ... | ... | ... | ... |

FIG. 21(a)

| | POSITION PART | DATA SIZE PART | ALLOCATION PART | DATA BUFFER PART |
|---|---|---|---|---|
| ENTRY 0 | 0 | 16384 | 0 | |
| ENTRY 1 | 16384 | 16384 | 0 | |
| ENTRY 2 | 65536 | 16384 | 0 | |
| ------ | ------ | ------ | ------ | |
| ENTRY K-1 | 1048576 | 6400 | 0 | |
| ENTRY K | 32768 | 16384 | 100 | |
| ------ | ------ | ------ | ------ | |
| ENTRY N-1 | 1032192 | 16384 | 5002 | |
| ENTRY N | 0 | 0 | 0 | |

FIG. 21(b)

| | POSITION PART | DATA SIZE PART | ALLOCATION PART | DATA BUFFER PART |
|---|---|---|---|---|
| ENTRY 0 | 32768 | 16384 | 100 | |
| ENTRY 1 | 49152 | 16384 | 101 | |
| ------ | ------ | ------ | ------ | |
| ENTRY M | 1032192 | 16384 | 5002 | |
| ENTRY M+1 | 0 | 0 | 0 | |

FIG. 22

| | POSITION PART | DATA SIZE PART | FILE ID PART | DATA BUFFER PART |
|---|---|---|---|---|
| ENTRY 0 | 0 | 16384 | 0 | |
| ENTRY 1 | 16384 | 16384 | 0 | |
| ...... | | | | |
| ENTRY S | 2080768 | 16384 | 0 | |
| ENTRY S+1 | 0 | 16384 | 1 | |
| ENTRY S+2 | 2097152 | 16384 | 0 | |
| ENTRY S+3 | 2113536 | 16384 | 0 | |
| ENTRY S+4 | 16384 | 16384 | 1 | |
| ...... | | | | |
| ENTRY T | 1310720 | 16384 | 1 | |
| ENTRY T+1 | 3145728 | 10240 | 0 | |
| ENTRY T+2 | 32768 | 16384 | 0 | |
| ENTRY T+3 | 1441792 | 16384 | 1 | |
| ENTRY T+4 | 49152 | 16384 | 0 | |
| ...... | | | | |

DATA RECORDING APPARATUS AND METHOD

BACKGROUND OF THE INVENTION

1. Field of the Invention

The present invention relates generally to a data recording apparatus and method, and more particularly, to a data recording apparatus provided in a computer system and a computer application equipment for recording continuous data such as images and voices and a data recording method carried out in the data recording apparatus.

2 Description of the Background Art

In recent years, in a PC (Personal Computer) and a home AV (Audio Visual) equipment, AV data digitized has been rapidly utilized through package media such as a CD-ROM (Computer Disk Read Only Memory) and a DVD-ROM (Digital Versatile Disk Read Only Memory)-ROM or communication media such as an internet and digital satellite broadcasting.

On the other hand, demands for recording of digital AV data by the PC and the home AV equipment have increased as a large-capacity hard disk unit or a rewritable optical disk unit which is detachably contained in a cartridge of an magneto-optical disk, a phase transition type optical disk, or the like has spread and a DVC-RAM (Random Access Memory) has appeared on the stage.

A moving image compression technique of an MPEG (Moving Picture Expert Group) system which is superior in the image quality and the compression rate has been mainly used today for digital AV data. For example, MPEG-2 which is close to broadcasting quality has been utilized as AV data for DVD which has been on the main current of a video disk. The data rate of the MPEG-2 is 3 to 11 Mbps (megabits per second). In an authoring apparatus for generating AV data for DVD-ROM, for example, however, a disk unit with a high speed which significantly exceeds 11 Mbps and a high-cost storage device such as a RAID (Redundant Array Inexpensive Disks) have been employed in order to record data with a rate of 3 to 11 Mbps. The reason for this is that digital AV data is continuous data over a long time period. In order to record the data in real time without interruption, therefore, fluctuations in the processing performance of a computer system constituting the authoring apparatus and the recording performance of the recording apparatus itself also be considered.

When an attempt to record the digital AV data by the PC is made, the recording speed is too low in the optical disk unit. In a standard hard disk unit, the recording speed thereof is higher than that of the optical disk unit but is not sufficient. In addition, the capacity thereof is insufficient. Although a hard disk unit for PC which is relatively low in cost has increased in speed year after year as the capacity thereof has increased, it is very difficult to record the digital AV data with a rate which is approximately equal to the rate of the MPEG-2 over a long time period.

Furthermore, in recording the digital AV data in a PC based system, continuous recording of data may, in some cases, be prevented by the following factors:

(1) overhead resulting from access to a file system depending on a relatively small allocation size, (2) operations peculiar to the recording apparatus, for example, access to a management data area, occurrence of seek by non-continuity of data areas, restart of a disk unit by a seek error, a temperature compensation operation, a write retry operation, and bad sector alternate processing, and (3) fluctuations in time of a processing operation by software sequential processing on a CPU (Central Processing Unit).

Therefore, the rate of the digital AV data which can be handled by the system is limited to not more than a value obtained by further subtracting a suitable margin from the worst value of the recording performance found in consideration of the above-mentioned preventing factors.

The apparent recording speed of the recording apparatus (as viewed from the CPU) has been conventionally increased not only for making the digital AV data recordable by the PC. One example is a method of providing a buffer memory in the storage device. A recent hard disk or optical disk has been generally equipped with a buffer memory having a capacity of 128 kilobytes to 2 megabytes. In this case, the effect of reducing the number of times of overhead described in the foregoing item (1) is also obtained by separating a recording request from the CPU and recording processing on the recording apparatus from each other and processing a plurality of recording requests from the CPU upon being collected as one recording request if possible.

However, in the above-mentioned buffer memory having a relatively small capacity, when the digital AV data is recorded, a buffer overflow sometimes occurs. Once the buffer memory is full of data, it goes without saying that the effect of increasing the apparent recording speed is not obtained.

In order to record the digital AV data by the PC, an auxiliary storage device with a speed higher than that of a storage device to be a target of writing (hereinafter referred to as a target storage device) has been conventionally provided at a front end of the recording apparatus, and used as a buffer or a cache. Typically, in recording the digital AV data on the optical disk by the PC, a method of creating an intermediate file as a buffer on the hard disk, to once store recording data from the CPU in the hard disk, and copy the stored data on the optical disk from the hard disk by background processing has been used.

A large-capacity and high-speed recording apparatus is realized by combining a high-speed auxiliary storage device with a target storage device having a large storage capacity and using the auxiliary storage device as a buffer device. Since the apparent recording speed is the recording speed itself of the auxiliary storage device, however, a storage device with a speed sufficiently higher than the rate of data to be recorded is still required. In the above-mentioned typical example, when an attempt to record the digital AV data on the optical disk by the PC, it is necessary to provide a hard disk unit with a speed sufficiently higher than the rate of the data.

In recording data, the amount of processing by the CPU is approximately three times, for example, data transfer to the auxiliary storage device, data reading from the auxiliary storage device, and data writing to the target storage device, as compared with that in a case where data is directly written into the target storage device.

SUMMARY OF THE INVENTION

Therefore, an object of the present invention is to provide a data recording apparatus and method, in which data continuously fed can be recorded without providing a storage device with a speed higher than the rate of the data, and the load applied to a CPU is light at the time of the recording.

In order to solve the above-mentioned problems, the present invention has the following features.

A first aspect of the present invention is directed to a data recording apparatus for recording data continuously fed, characterized by comprising:

first storing means for storing the data;

second storing means in a parallel relation with the first storing means for recording a part of the data; and recording managing means for issuing a recording instruction to the first storing means and a recording instruction to the second storing means while mutually switching the recording instructions in accordance with a proceeding of the data feed.

As described in the foregoing, in the first aspect, the data continuously fed are recorded upon being shared between the first storing means and the second storing means, so that the apparent recording speed is equal to the sum of the recording speed of the first storing means and the recording speed of the second storing means. As a result, recording can be performed at a higher speed. In other words, in order to make recording at a required recording speed, the apparatus according to the present invention need not necessarily comprise storing means with a speed higher than the speed, unlike the conventional apparatus.

A second aspect is characterized in the first aspect by further comprising:

recorded state monitoring means for monitoring a state where the recording instruction to the first storing means issued by the recording managing means is executed, wherein the recording managing means determining which of the recording instruction to the first storing means and the recording instruction to the second storing means should be issued on the basis of the result of the monitoring by the recorded state monitoring means when the recording instruction to the first storing means and the recording instruction to the second storing means are issued while being mutually switched.

As described in the foregoing, in the second aspect, recording processing is shared between the first storing means and the second storing means depending on the state where the recording instruction to the first storing means is executed, so that only data which cannot be recorded by the first storing means are saved in the second storing means, for example, so that the load applied to a CPU can be also reduced in transferring the saved data toward the first storing means.

A third aspect is characterized in that in the second aspect the recording managing means further issues a transfer instruction to transfer the data recorded on the second storing means toward the first storing means on the basis of the result of the monitoring by the recorded state monitoring means.

As described in the foregoing, in the third aspect, the data recorded on the first storing means and the second storing means upon being divided are collected by transferring the data recorded on the second storing means toward the first storing means. As a result, convenience in utilizing the data is enhanced.

A fourth aspect is characterized in the second aspect in that, the recorded state monitoring means comprises;
a buffer memory for temporarily storing the data to be written into the first storing means: and
buffer data amount measuring means for measuring the amount of the data stored in the buffer memory, and the recording managing means judges whether or not the result of the measurement by the buffer data amount measuring means is not more than a first reference value, to issue the recording instruction to the first storing means when the result of the judgment is affirmative, while issuing the recording instruction to the second storing means when it is negative.

As described in the foregoing, in the fourth aspect, the data to be written into the first storing means is temporarily stored, and it is judged whether the stored data should be recorded on the first storing means or the second storing means on the basis of the amount of the stored data, so that the judgment can be made easily and with high precision.

A fifth aspect is characterized in that in the fourth aspect, the recording managing means further judges whether or not the result of the measurement by the buffer data amount measuring means is not more than a second reference value when the recording instruction to the second storing means is issued, to continuously issue the recording instruction to the second storing means until the result of the judgment is affirmative.

As described in the foregoing, in the fifth aspect, when the recording on the second storing means is started once, the recording is continued for a predetermined time period, so that continuity of the recorded data is increased. As a result, batch processing of data transfer from the first storing means to the second storing means becomes easy, and the apparent recording speed is increased.

A sixth aspect is characterized in that in the fourth aspect, the buffer memory stores, in addition to the data, the size of the data and the position thereof in a file.

As described in the foregoing, in the sixth aspect, the size of the data and the position thereof in the file are stored. Even if the data at any position in the file is saved in the second storing means, a complete file can be restored by the first storing means after the data is transferred.

A seventh aspect is characterized in that in the sixth aspect, the buffer memory further stores an identifier of the file.

As described in the foregoing, in the seventh aspect, the identifier of the file to which the data belongs is stored, so that data belonging to a plurality of files need not be individually stored for each file.

An eighth aspect is characterized in that in the sixth aspect, the buffer memory further stores, when the data recorded on the second storing means is transferred, position information in an area of the first storing means for recording the data.

As described in the foregoing, in the eighth aspect, the position information (allocation) in the area of the first storing means for recording the data transferred from the second storing means is further stored, so that position information for recording the transferred data need not be retrieved by the first storing means. As a result, the number of times of overhead resulting from the retrieval is reduced, for example, so that the apparent recording speed is increased.

A ninth aspect is characterized in the sixth aspect, the buffer memory stores, when it stores the size of the data, sizes other than sizes which can be actually taken, thereby notifying the first storing means that recording on the second storing means is made.

As described in the foregoing, in the ninth aspect, the first storing means can know that the recording on the second storing means is made, so that the data transferred from the second storing means can be previously ensured in the first storing means. Further, the notification is made using the size of the data, so that the notification can be simplified.

A tenth aspect is characterized in that in the third aspect, the first storing means ensures, when it detects that the data is recorded on the second storing means, an area for recording, when the data is transferred, the data, creates a table related to the data, and stores in the table position information in the ensured area, As described in the foregoing, in the tenth aspect, at the time point where the data is recorded on the second storing means, the area for recording the data which will be transferred in the future is ensured in the first storing means and the position information (allocation) in the area is stored in the table. When the data is transferred to the first storing means, the data can be recorded in a state where continuity between the data and data preceding and succeeding the data is ensured.

An eleventh aspect is characterized in that in the third aspect, the recording managing means issues the transfer instruction when there is no new recording request and the result of the monitoring by the recorded state monitoring means satisfies the second condition.

As described in the foregoing, in the eleventh aspect, the transfer instruction is issued when there is no new recording request, and the state where the recording instruction to the first storing means is executed satisfies the second condition, so that the data saved in the second storing means can be transferred to the first storing means without preventing the current recording request from being executed.

A twelfth aspect is characterized in that in the third aspect, the recording managing means judges whether or not the amount of data written into the first storing means directly without passing through the second storing means within a predetermined time period is not more than a third reference value, to issue the transfer instruction when the result of the judgment is affirmative, and the result of the monitoring by the recorded state monitoring means satisfies the second condition.

As described in the foregoing, in the twelfth aspect, the transfer instruction is issued when the amount of the data directly written into the first storing means is not more than the third reference value within a predetermined time period, and the state where the recording instruction to the first storing means is executed satisfies the second condition, so that the data saved in the second storing means can be transferred toward the first storing means more efficiently while preventing the current recording request from being executed.

A thirteenth aspect is directed to a data recording method carried out in a data recording apparatus comprising first and second storing means for recording data continuously fed, characterized by comprising the steps of:

issuing a recording instruction to the first storing means and a recording instruction to the second storing means while mutually switching the recording instructions in accordance with a proceeding of the data feed; and recording on the second recording means a part of the data to be recorded on the first storing means.

As described in the foregoing, in the thirteenth aspect, the data continuously fed are recorded upon being shared between the first storing means and the second storing means, so that the apparent recording speed is equal to the sum of the recording speed of the first storing means and the recording speed of the second storing means. As a result, higher-speed recording can be made. In other words, in order to make the recording at a required recording speed, the apparatus according to the present invention need not necessarily comprise storing means with a speed higher than the speed, unlike the conventional apparatus.

A fourteenth aspect is characterized in the thirteenth aspect by further comprising the steps of:

monitoring a state where the recording instruction to the first storing means is executed: and determining which of the recording instruction to the first storing means and the recording instruction to the second storing means should be issued on the basis of the result of the monitoring when the recording instruction to the first storing means and the recording instruction to the second storing means are issued while being switched.

As described in the foregoing, in the fourteenth aspect, the recording processing is shared between the first storing means and the second storing means depending on the state where the recording instruction to the first storing means is executed, so that only data which cannot be recorded on the first storing means can be saved in the second storing means, for example, so that the load applied to a CPU in transferring the saved data toward the first storing means can be also reduced.

A fifteenth aspect is characterized by further comprising, in the fourteenth aspect, the step of issuing a transfer instruction to transfer the data recorded on the second storing means toward the first storing means on the basis of the result of the monitoring.

As described in the foregoing, in the fifteenth aspect, the data recorded on the second storing means are transferred toward the first storing means, so that the data recorded on the first storing means and the second storing means upon being divided are collected. As a result, convenience in utilizing the data is enhanced.

A sixteenth aspect is characterized in the fourteenth aspect by comprising:

in monitoring a state where the recording instruction to the first storing means is executed,
the step of temporarily storing the data to be written into the first storing means; and
the step of measuring the amount of the stored data and in determining which of the recording instruction to the first storing means and the recording instruction to the second storing means should be issued,
the step of judging whether or not the result of the measurement is not more than a first reference value; and
the step of issuing the recording instruction to the first storing means when the result of the judgment is affirmative, while issuing the recording instruction to the second storing means when it is negative.

As described in the foregoing, in the sixteenth aspect, the data to be written into the first storing means is temporarily stored, and it is judged whether the stored data should be recorded on the first storing means or the second storing means on the basis of the amount of the stored data, so that the judgment can be made easily and with high precision.

A seventeenth aspect is characterized in the sixteenth aspect by further comprising:

in issuing the recording instruction to the second storing means,
the step of judging whether or not the result of the measurement is not more than a second reference value; and
the step of continuously issuing the recording instruction to the second storing means until the result of the judgment is affirmative.

As described in the foregoing, in the seventeenth aspect, once recording on the second storing means is started, the recording is continued for a predetermined time period, so that continuity of the recorded data is increased. As a result, batch processing of data transfer from the first storing means to the second storing means becomes easy, and the apparent recording speed is also increased.

An eighteenth aspect is characterized by further comprising, in the sixteenth aspect, in temporarily storing the data to be written into the first storing means, the step of storing, in addition to the data, the size of the data and the position thereof in a file.

As described in the foregoing, in the eighteenth aspect, the size of the data and the position thereof in the file are stored. Even if the data at any position in the file is saved in the second storing means, a complete file can be restored by the first storing means after the data is transferred.

A nineteenth aspect is characterized by further comprising, in the eighteenth aspect, in temporarily storing the data to be written into the first storing means, the step of storing an identifier of the file.

As described in the foregoing, in the nineteenth aspect, the identifier of the file to which the data belongs is stored, so that data belonging to a plurality of files need not be individually stored for each file.

A twentieth aspect is characterized by further comprising, in the eighteenth aspect, in temporarily storing the data to be written into the first storing means, the step of storing, when the data recorded on the second storing means is transferred, position information in an area of the first storing means for recording the data.

As described in the foregoing, in the twentieth aspect, the position information (allocation) in the area of the first storing means for recording the data transferred from the second storing means is further stored, so that position information for recording the transferred data need not be retrieved by the first storing means. As a result, the number of times of overhead resulting from the retrieval is reduced, for example, so that the apparent recording speed is increased.

A twenty-first aspect is characterized by further comprising, in the eighteenth aspect, in storing the size of the data to be written into the first storing means, the step of storing sizes other than sizes which can be actually taken, thereby notifying the first storing means that recording on the second storing means is made.

As described in the foregoing, in the twenty-first aspect, the first storing means can identify that the recording on the second storing means is made, so that the area for recording the data transferred from the second storing means can be previously ensured in the first storing means. Further, the notification is made using the size of the data, so that the notification can be simplified.

A twenty-second aspect is characterized by further comprising, in the fifteenth aspect, when it is detected that the data is recorded on the second storing means, the step of ensuring an area for recording the data when the data is transferred to the first storing means, creating a table related to the data, and storing position information in the ensured area in the table.

As described in the foregoing, in the twenty-second aspect, at the time point where the data is recorded on the second storing means, the area for recording the data which will be transferred in the future is ensured in the first storing means, and the position information (allocation) in the area is stored in the table. When the data is transferred to the first storing means, therefore, recording can be made in a state where continuity between the data and data preceding and succeeding the data is ensured.

A twenty-third aspect is characterized by further comprising, in the fifteenth aspect, the step of issuing the transfer instruction when there is no new recording request and the result of the monitoring satisfies the second condition.

As described in the foregoing, in the twenty-third aspect, the transfer instruction is issued when there is no new recording request and the state where the recording instruction to the first storing means is executed satisfies the second condition, so that the data saved in the second storing means can be transferred toward the first storing means without preventing the current recording request from being executed.

A twenty-fourth aspect is characterized by further comprising, in the fifteenth aspect, the step of judging whether or not the amount of data written into the first storing means directly without passing through the second storing means within a predetermined time period is not more than a third reference value, to issue the transfer instruction when the result of the judgment is affirmative and the result of the monitoring satisfies the second condition.

As described in the foregoing, in the twenty-fourth aspect, the transfer instruction is issued when the amount of the data directly written into the first storing means within a predetermined time period is not more than the third reference value and the state where the recording instruction to the first storing means satisfies the second condition, so that the data saved in the second storing means can be transferred toward the first storing means more efficiently while preventing the current recording request from being executed.

A twenty-fifth aspect is directed to a recording medium executed in a data recording apparatus comprising first and second storing means and having a program for recording data continuously fed recorded thereon, wherein the program realizes on the data recording apparatus an operational environment characterized by comprising the steps of issuing a recording instruction to the first storing means and a recording instruction to the second storing means while mutually switching the recording instructions in accordance with a proceeding of the data feed, and recording on the second storing means a part of the data to be recorded on the first storing means.

A twenty-sixth aspect is characterized in that in the twenty-fifth aspect, the program realizes on the data recording apparatus an operational environment characterized by further comprising the steps of:

monitoring a state where the recording instruction to the first storing means is executed; and determining which of the recording instruction to the first storing means and the recording instruction to the second storing means should be issued on the basis of the result of the monitoring when the recording instruction to the first storing means and the recording instruction to the second storing means are issued while being mutually switched.

A twenty-seventh aspect is characterized in that in the twenty-sixth aspect, the program realizes on the data recording apparatus an operational environment characterized by further comprising the step of:

issuing a transfer instruction to transfer data recorded on the second storing means toward the first storing means on the basis of the result of the monitoring.

A twenty-eighth aspect is characterized in that in the twenty-sixth aspect, the program realizes on the data recording apparatus an operational environment characterized by further comprising:

in mounting a state where the recording instruction to the first storing means is executed, the step of temporarily storing the data to be written into the first storing mean; and the step of measuring the amount of the stored data, and in determining which of the recording instruction to the first storing means and the recording instruction to the second storing means should be issued, the step of judging whether or not the result of the measurement is not more than a first reference value; and the step of issuing the recording instruction to the first storing means when the result of the judgment is affirmative, while issuing the recording instruction to the second storing means when it is negative.

A twenty-ninth aspect is characterized in that in the twenty-eighth aspect, the program further realizes on the data recording apparatus an operational environment characterized by comprising:

in issuing the recording instruction to the second storing means, the step of judging whether or not the result of the measurement is not more than a second reference value; and the step of continuously issuing the recording instruction to the second storing means until the result of the judgment is affirmative.

A thirtieth aspect is characterized in that in the twenty-eighth aspect, the program realizes on the data recording apparatus an operational environment characterized by further comprising, in temporarily storing the data to be written into the first storing means, the step of storing, in addition to the data, the size of the data and the position thereof in a file.

A thirty-first aspect is characterized in that in the thirtieth aspect, the program realizes on the data recording apparatus an operational environment characterized by further comprising, in temporarily storing the data to be written into the first storing means, the step of storing an identifier of the file.

A thirty-second aspect is characterized in that in the thirtieth aspect, the program realizes on the data recording apparatus an operational environment characterized by further comprising, in temporarily storing the data to be written into the first storing means, the step of storing, when the data recorded on the second storing means is transferred, position information in an area of the first storing means for recording the data.

A thirty-third aspect is characterized in that in the thirtieth aspect, the program realizes on the data recording apparatus an operational environment characterized by further comprising, in storing the size of the data to be written into the first storing means, the step of storing sizes other than sizes which can be actually taken, thereby notifying the first storing means that recording on the second storing means is made.

A thirty-fourth aspect is characterized in that in the twenty-seventh aspect, the program realizes on the data recording apparatus an operational environment characterized by further comprising, when it is detected that the data is recorded on the second storing means, the step of ensuring an area for recording the data when the data is transferred to the first storing means, creating a table related to the data, and storing position information in the ensured area in the table.

A thirty-fifth aspect is characterized in that in the twenty-seventh aspect, the program realizes on the data recording apparatus an operational environment characterized by further comprising the step of issuing the transfer instruction when there is no new recording request, and the result of the monitoring satisfies the second condition.

A thirty-sixth aspect is characterized in that in the twenty-seventh aspect, the program realizes on the data recording apparatus an operational environment characterized by further comprising the step of judging whether or not the amount of data written into the first storing means directly without passing through the second storing means within a predetermined time period is not more than a third reference value, to issue the transfer instruction when the result of the judgment is affirmative, and the result of the monitoring satisfies the second condition.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 18 is a diagram showing the structures of buffer memories 5 and 7 in an apparatus shown in FIG. 8 (a sixth embodiment);

FIG. 19 is a diagram (corresponding to FIG. 18(a)) showing an example of the contents of a position part and a data size part in a buffer memory 5 in an apparatus shown in FIG. 8 (a seventh embodiment);

FIG. 21 is a diagram showing the structures of buffer memories 5 and 7 in an apparatus shown in FIG. 8 (an eighth embodiment); and FIG. 22 is a diagram showing the structure of a buffer memory 5 in an apparatus shown in FIG. 8 (a ninth embodiment).

DESCRIPTION OF THE PREFERRED EMBODIMENTS

First Embodiment

Figure 1:
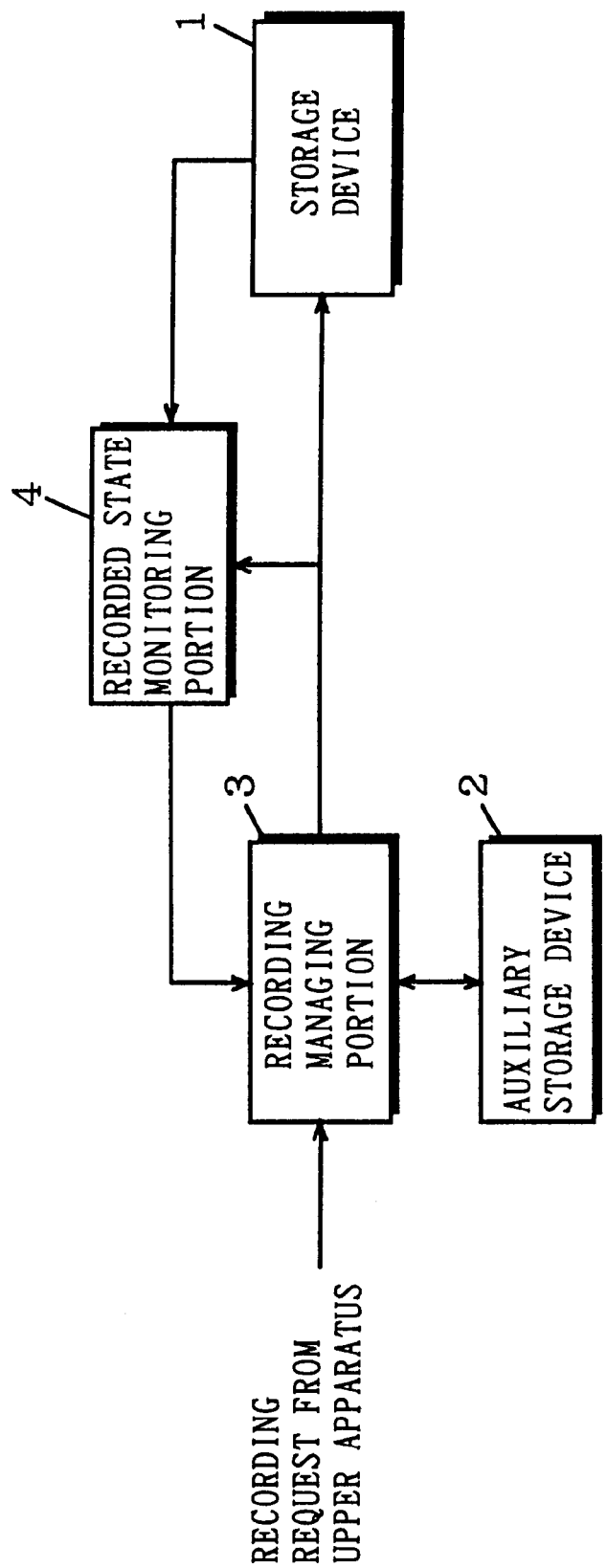
FIG. 1 is a block diagram showing the construction of a data recording apparatus according to a first embodiment of the present invention.

A first embodiment of the present invention will be described while referring to the drawings.

FIG. 1 is a block diagram showing the construction of a data recording apparatus according to the first embodiment of the present invention. Description is now made of operations performed by the apparatus shown in FIG. 1 for recording data continuously fed from an upper apparatus (not shown). The apparatus shown in FIG. 1 may record data fed from an upper software installed in the apparatus shown in FIG. 1 itself, instead of data fed from an upper apparatus. The apparatus shown in FIG. 1 is the same as the conventional apparatus described in the item "Description of the Background Art" in that it efficiently executes a recording request from the upper apparatus using an auxiliary storage device, while differing from the conventional apparatus in that the recording speed of the auxiliary storage device may not necessarily be not less than a recording speed required by the upper apparatus.

In FIG. 1, a storage device 1 stores data to be written into a file ("data" hereinafter refers to "data to be written into a file" unless a particular proviso is added). An auxiliary storage device 2 stores a part of the data (hereinafter referred to as "difference data"; which will be described later). A recorded state monitoring portion 4 monitors a state where a recording instruction to the storage device 1 is executed. The state where the recording instruction to the storage device 1 is executed is found by comparing the speed of the recording request from the upper apparatus with the recording speed of the storage device 1, for example.

A recording managing portion 3 judges, when it receives the recording request from the upper apparatus, whether or not the storage device 1 can execute the recording request on the basis of the result of the monitoring by the recorded state monitoring portion 4. The recording managing portion 3 issues a recording instruction to the storage device 1 or issues a recording instruction to the auxiliary storage device 2 depending on the result of the judgment.

The recording request is a request for execution issued by a computer program (an upper apparatus) having a call of a write function to a file and processing related thereto, for example, as a unit, and the recording instruction is information transmitted to a storage device in order to perform a recording operation. That is, the recording instruction is a lower recording request for controlling the order in which recording operations of the storage device are executed.

Consequently, a series of recording requests from the upper apparatus shall be divided into recording instructions to the storage device 1 and recording instructions to the auxiliary storage device 2. As a result, incomplete data lacking data (difference data) saved in the auxiliary storage device 2 is stored in the storage device 1. In the case, if the storage device 1 is a device including media which is detachable, for example, an optical disk, the media cannot be carried or used in another equipment.

The recording managing portion 3 further judges whether or not the difference data in the auxiliary storage device 2 can be transferred to the storage device 1, that is, the storage device 1 can record, when the difference data is transferred, the difference data on the basis of the result of the monitoring by the recorded state monitoring portion 4. When the result of the judgment is affirmative, the recording managing portion 3 issues an instruction to transfer the data saved in the auxiliary storage device 2 toward the storage device 1 (hereinafter referred to as a transfer instruction). Alternatively, it may issue the transfer instruction at the time point where the recording request from the upper apparatus is simply terminated. Consequently, all data are finally recorded on the storage device 1.

Methods of recording the difference data on the auxiliary storage device 2 are broadly classified into two methods. The first method is a method of creating a particular file and reading and writing the difference data to and from the auxiliary storage device 2 through a file system. The second method is a method of previously ensuring a particular area and reading and writing the difference data to and from the auxiliary storage device 2 directly without passing through a file system. In order to previously ensure a recording area, there is a method of producing a dedicated partition, for example, and ensuring a part of a file area as a special file which is not changed by the file system or ones conforming thereto.

Figure 2:
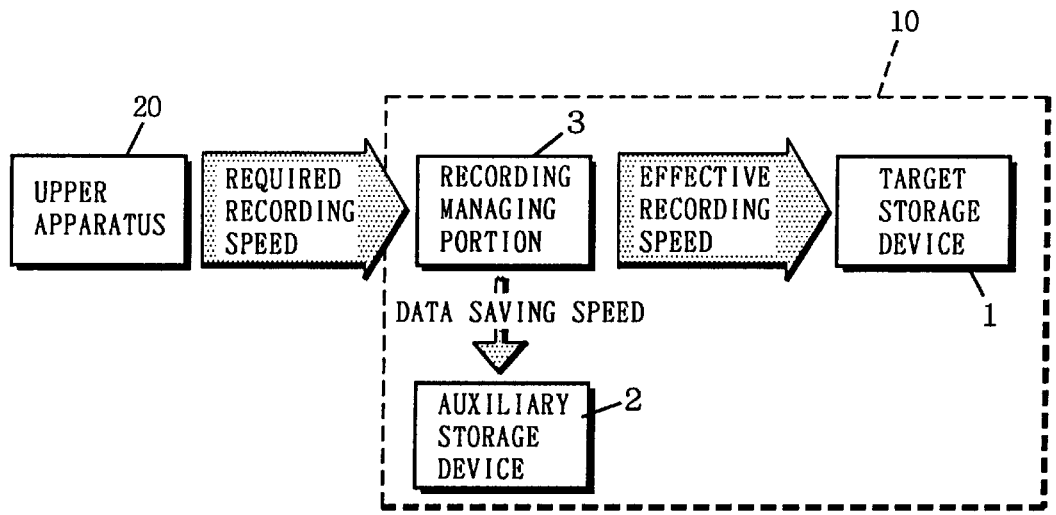
FIG. 2 is a diagram visually showing an aspect in which the required recording speed is more than the effective recording speed in the apparatus shown in FIG. 1.
Figure 3:
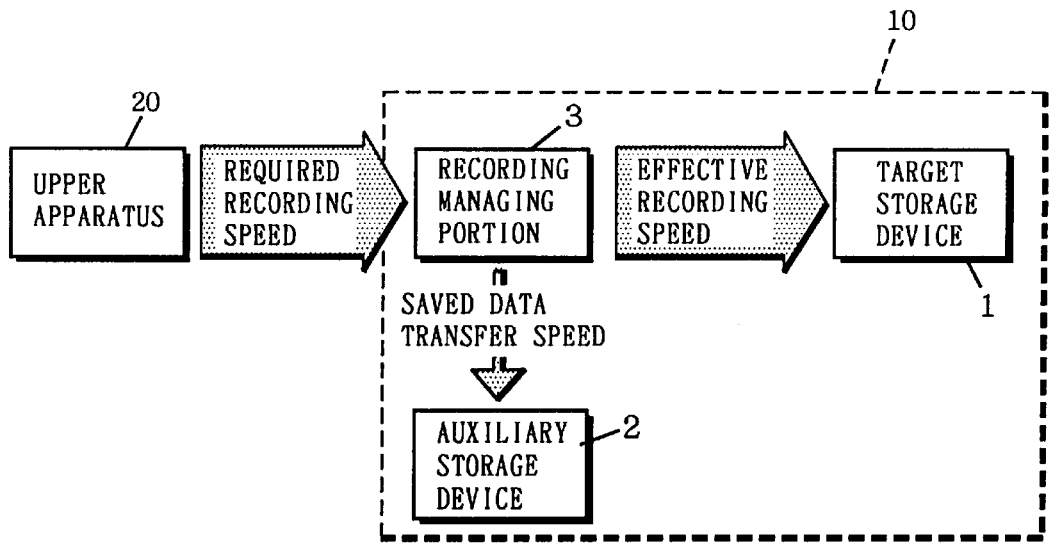
FIG. 3 is a diagram visually showing an aspect in which the required recording speed is less than the effective recording speed in the apparatus shown in FIG. 1.
Figure 4:
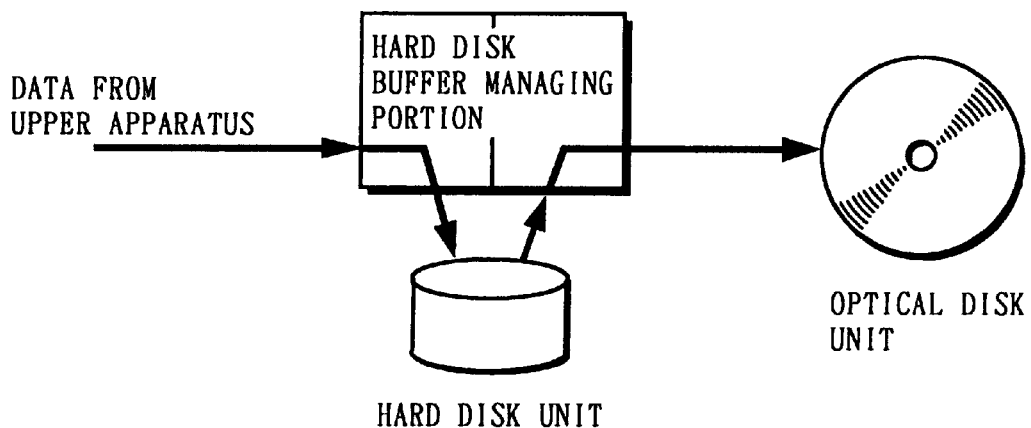
FIG. 4 is a diagram for specifically explaining the difference between the conventional apparatus and the apparatus shown in FIG. 1.
Figure 4:
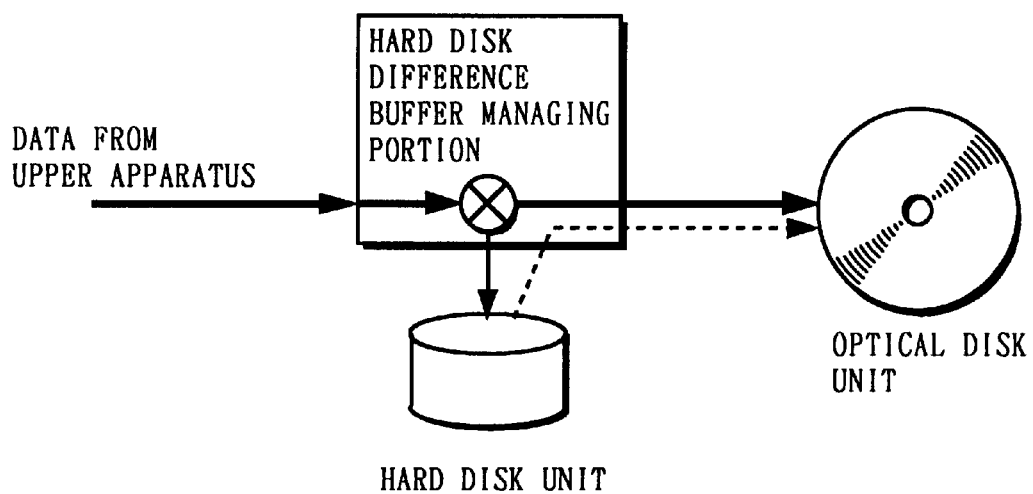

Description is now made of operations performed by the apparatus shown in FIG. 1 using FIGS. 2 and 3. A recording speed (the amount of data recording per unit time) required of a data recording apparatus 10 (the same apparatus as that shown in FIG. 1; where the recorded state monitoring portion 4 is omitted, and the storage device 1 is described as a target storage device 1) by an upper apparatus 20 is referred to as a required recording speed. A recording speed required of the storage device 1 ordered by the recording managing portion 3 is referred to as an effective recording speed, and a recording speed required of the auxiliary storage device 2 is referred to as a data saving speed. Further, a transfer speed required of the auxiliary storage device 2 ordered by the recording managing portion 3 (the amount of data transfer per unit time from the auxiliary storage device 2 to the storage device 1) is referred to as a saved data transfer speed.

FIG. 2 is a diagram visually showing an aspect in which the required recording speed is more than the effective recording speed in the apparatus shown in FIG. 1. If the required recording speed is taken as 600 kilobytes per second and the effective recording speed is taken as 500 kilobytes per second, for example, the apparatus shown in FIG. 1 can process a recording request from the upper apparatus 20 in real time by comprising the auxiliary storage device 2 with a data saving speed of 100 kilobytes per second.

FIG. 3 is a diagram visually showing an aspect in which the required recording speed is less than the effective recording speed in the apparatus shown in FIG. 1. If the required recording speed is taken as 400 kilobytes per second and the effective recording speed is taken as 500 kilobytes per second, for example, the difference data stored as shown in FIG. 2 can be transferred from the auxiliary storage device 2 toward the storage device 1 at a saved data transfer speed of a maximum of 100 kilobytes per second in addition to the current recording request from the upper apparatus 20.

In the above-mentioned example, FIGS. 2 and 3 are the same in the effective recording speed, while differing in the required recording speed. This is a case seen in a system using an image compression technique employing a variable recording rate, for example, an MPEG-2 system for DVD.

For example, the required recording speed may be set to 500 kilobytes per second and the effective recording speed may be set to 400 kilobytes per second in FIG. 2, and the required recording speed may be 500 kilobytes per second and the effective recording speed may be 600 kilobytes per second in FIG. 3. This is a case seen in a system using an image compression technique employing a fixed recording rate, for example, a general MPEG system. An example of a storage device whose effective recording speed varies is a disk unit employing a Z-CAV (Zone Constant Angular Velocity) system, for example.

As can be seen from the foregoing, the recording requests from the upper apparatus are allocated to the storage device 1 and the auxiliary storage device 2 upon being divided, so that the apparent recording speed is equal to the sum of the recording speed of the storage device 1 and the recording speed of the auxiliary storage device 2. As a result, a recording request with a higher speed can be processed. In other words, in order to process a recording speed required by the upper apparatus, the apparatus shown in FIG. 1 need not necessarily comprise a storage apparatus with a speed higher than the recording speed.

The data saved in the auxiliary storage device 2 is transferred toward the storage device 1, so that the data recorded on the storage device 1 and the auxiliary storage device 2 upon being divided are collected. As a result, convenience in utilizing the data is enhanced.

Furthermore, when the data are recorded on the storage device 1 and the auxiliary storage device 2 upon being divided, the required recording speed from the upper apparatus and the recording speed of the storage device 1 are compared with each other, to record, when the required recording speed is more than the recording speed, the data on the auxiliary storage device 2 at a speed equal to the difference therebetween, thereby making the amount of the difference data saved in the auxiliary storage device 2 as small as possible. As a result, save/transfer processing of the difference data is lightened, so that the load applied to the upper apparatus (CPU) is reduced. In addition, it is possible to reduce the number of times of overhead resulting from writing/reading to/from the auxiliary storage device 2.

In order to make the difference between the conventional apparatus and the apparatus shown in FIG. 1 clearer, the recording speeds of both the apparatus and a load factor on the CPU are quantitatively evaluated and compared with each other by taking specific examples.

FIGS. 4 to 7 are diagrams for specifically explaining the difference between the conventional apparatus and the apparatus shown in FIG. 1. In FIGS. 4 to 7, (a) denotes a hard disk buffer corresponding to the conventional apparatus, and (b) denotes a hard disk difference buffer corresponding to the apparatus shown in FIG. 1. The input/output performance of a hard disk unit is taken as 20 Mbps, and the input/output performance of an optical disk unit is taken as 4 Mbps.

In the hard disk buffer shown in FIG. 4(a), all data from the upper apparatus are recorded once on the hard disk unit through a hard disk buffer managing portion. Simultaneously, data to be recorded on the optical disk unit are read out from the hard disk unit. On the other hand, in the hard disk difference buffer shown in FIG. 4(b), many of the data from the upper apparatus are directly recorded on the optical disk unit through a hard disk difference buffer managing portion. Only the data which cannot be recorded on the optical disk unit (difference data) are recorded on the hard disk unit.

Figure 5A:
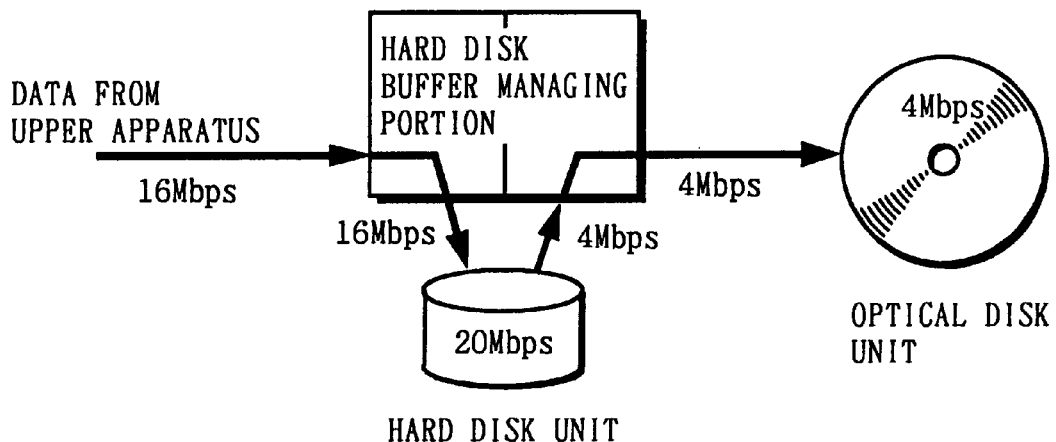
FIG. 5 is another diagram for specifically explaining the difference between the conventional apparatus and the apparatus shown in FIG. 1.
Figure 5B:
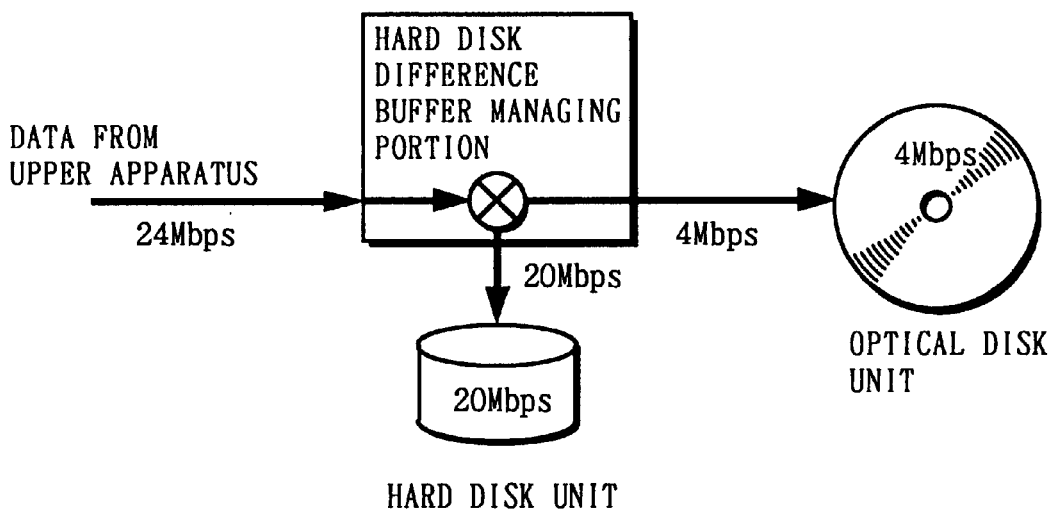

The recording speeds are then evaluated and compared with each other using FIG. 5. In the hard disk buffer shown in FIG. 5(a), the maximum value of the recording rate is determined by the performance of the hard disk unit. Reading at a rate of 4 Mbps is performed in parallel with the recording, so that the maximum value of the recording rate is 20 Mbps−4 Mbps=16 Mbps. On the other hand, in the hard disk difference buffer shown in FIG. 5(b), data can be simultaneously recorded on the optical disk unit and the hard disk unit, so that the maximum value of the recording rate is 20 Mbps+4 Mbps=24 Mbps. That is, the hard disk difference buffer shown in FIG. 5(b) can make recording at a speed higher than that of the hard disk buffer shown in FIG. 5(a) irrespective of the fact that the data are recorded on the storage devices having the same performance.

Figure 6:
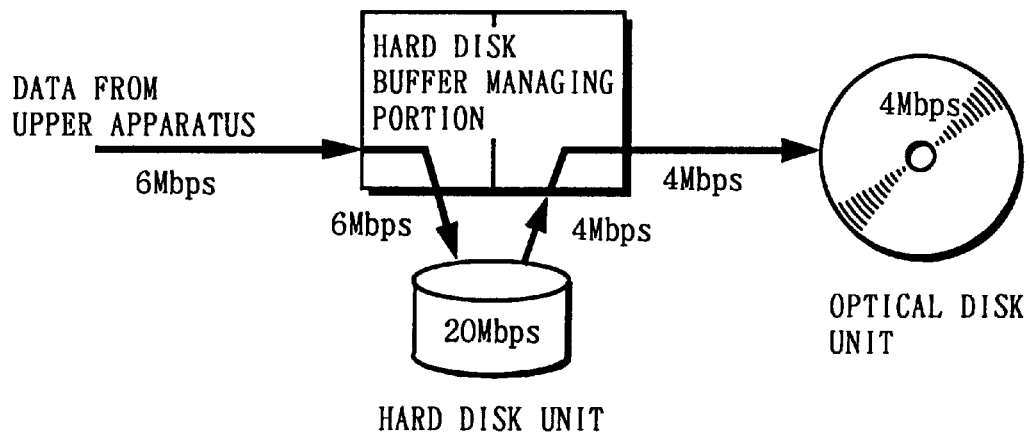
FIG. 6 is still another diagram for specifically explaining the difference between the conventional apparatus and the apparatus shown in FIG. 1.
Figure 6:
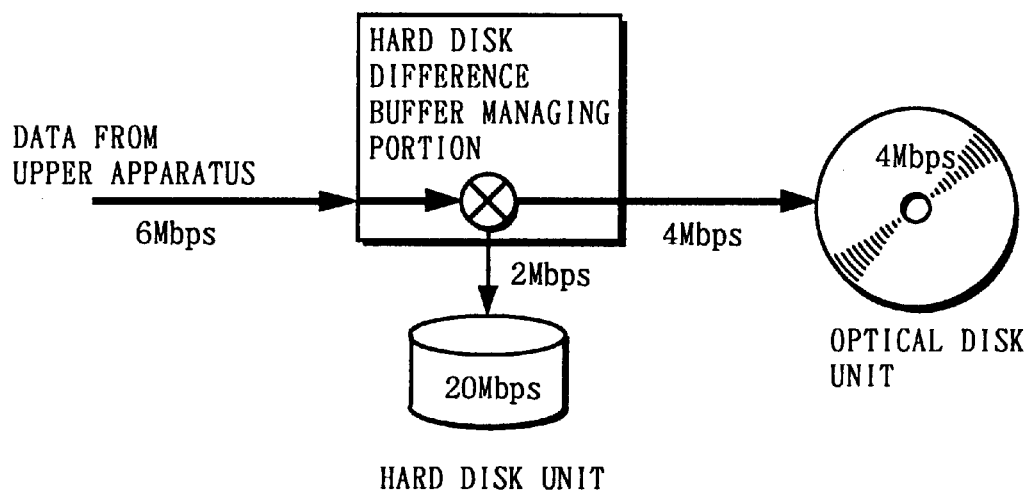

In FIG. 6, the magnitudes of the loads applied to the CPU are evaluated and compared with each other in a case where recording at a rate of 6 Mbps is made for ten minutes. As an evaluated value representing the magnitude of the load, a value obtained by dividing the input/output rate to/from the storage device by the input/output performance of the storage device is employed. In both the hard disk buffer shown in FIG. 6(a) and the hard disk difference buffer shown in FIG. 6(b), data are stored in the hard disk unit at a speed of 2 Mbps corresponding to the difference between the rate of the data from the upper apparatus (6 Mbps) and the recording rate of the optical disk unit (4 Mbps).

At this time, in the hard disk buffer shown in FIG. 6(a), the magnitude of the load is (input/output to/from HD)/(performance of HD)+(input/output to/from OD)/(performance of OD)=(6 Mbps+4 Mbps)/20 Mbps+4 Mbps/4 Mbps=1.5 (where HD is the hard disk unit, and OD is the optical disk unit; the same is true for the following).

On the other hand, in the hard disk difference buffer shown in FIG. 6(b), the magnitude of the load is (input/output to/from HD)/(performance of HD)+(input/output to/from OD)/(performance of OD)=2 Mbps/20 Mbps+4 Mbps/4 Mbps=1.1.

That is, the load applied to the CPU in the hard disk difference buffer shown in FIG. 6(b) is lighter than that in the hard disk buffer as shown in FIG. 6(a) irrespective of the fact that the data are recorded on the storage devices having the same performance at the same speed only for the same time period.

Figure 7A:
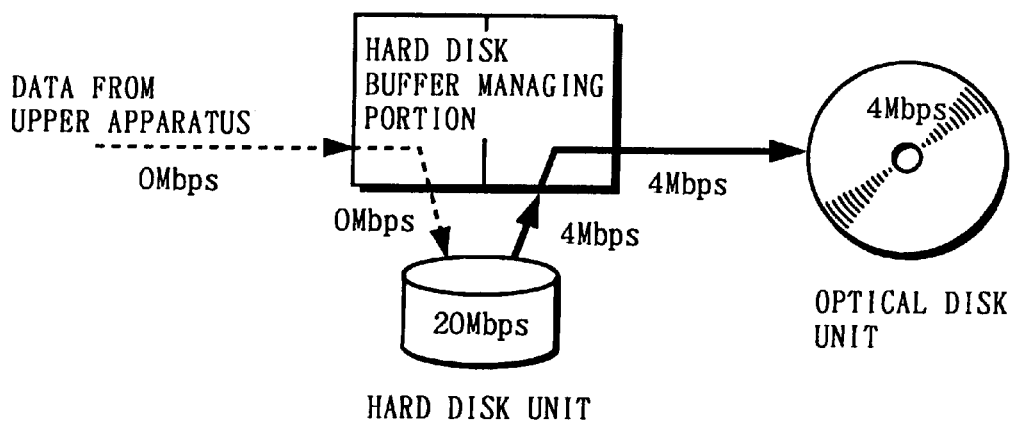
FIG. 7 is a further diagram for specifically explaining the difference between the conventional apparatus and the apparatus shown in FIG. 1.
Figure 7B:
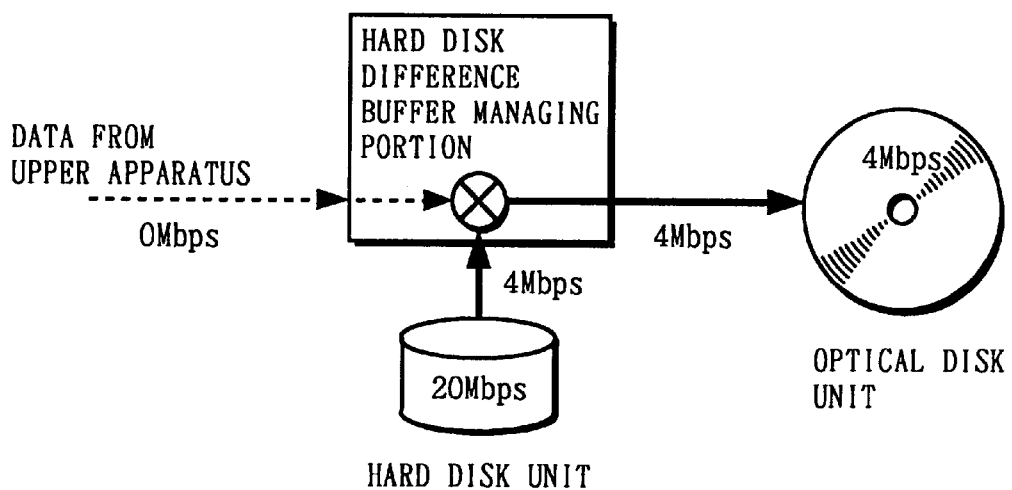

The magnitudes of the loads applied to the CPU in transferring the data stored in the hard disk unit to the optical disk unit as shown in FIG. 6 are evaluated and compared with each other using FIG. 7. In both the hard disk buffer shown in FIG. 7(a) and the hard disk difference buffer shown in FIG. 7(b) data with a rate of 2 Mbps for ten minutes are stored when the transfer is started. Both the data are transferred to the optical disk unit at a rate of 4 Mbps, so that the loads applied to the CPU at the time of the transfer are the same in the hard disk buffer shown in FIG. 7(a) and the hard disk difference buffer shown in FIG. 7(b).

Although description was made of a case where the hard disk unit with a rate of 20 Mbps and the optical disk unit with a rate of 4 Mbps are combined with each other, devices with various recording speeds can be combined with each other as required. In the case, it goes without saying that the device with the higher speed need not necessarily be used as the auxiliary storage device 2. A plurality of hard disk units may be combined with each other, and a plurality of optical disk units may be combined with each other. Alternatively, the hard disk units and the optical disk units may be combined with each other upon being mixed.

For example, in recording data on a 650-megabyte MO drive in the PC, an old 230-megabyte MO drive is used as the auxiliary storage device 2. Alternatively, one of the plurality of hard disk units is used as the auxiliary storage device 2 in an authoring apparatus described in the item "Description of the Background Art".

Second Embodiment

A second embodiment of the present invention will be described while referring to the drawings.

Figure 8:
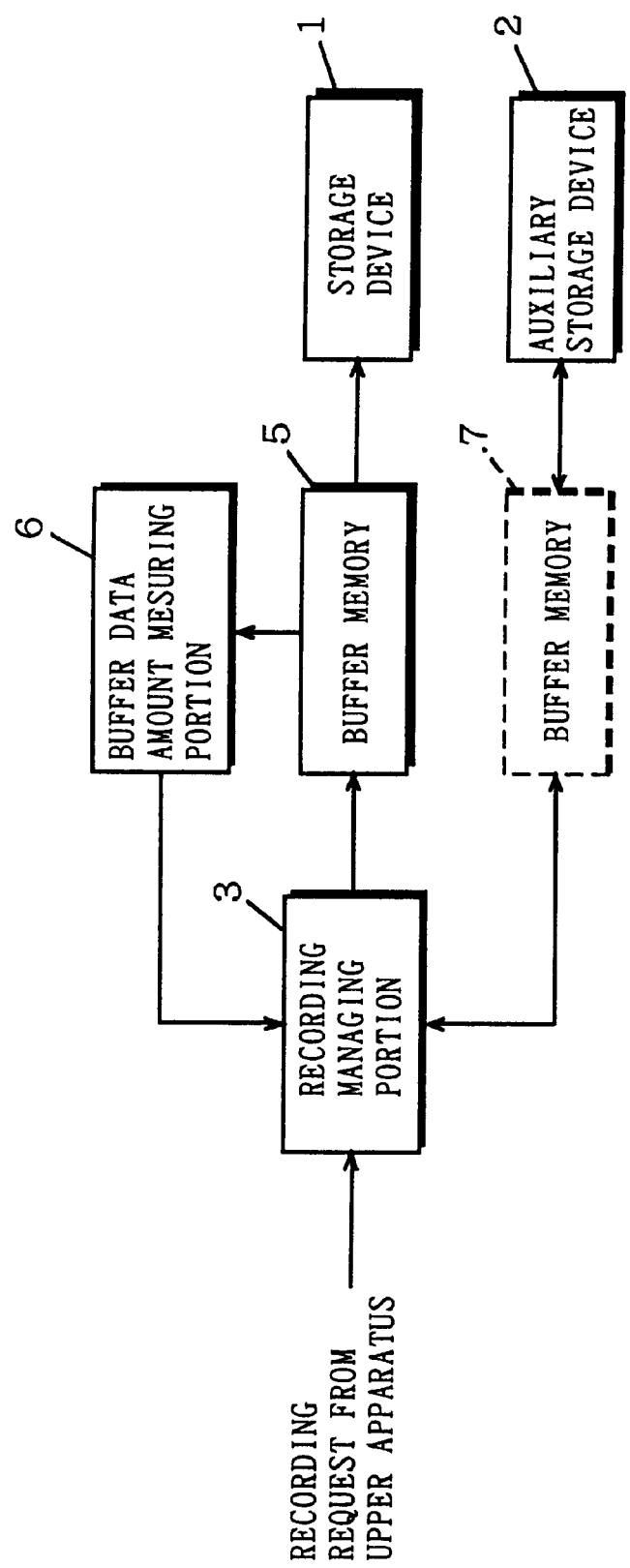
FIG. 8 is a block diagram showing the construction of a data recording apparatus according to a second embodiment of the present invention.

FIG. 8 is a block diagram showing the construction of a data recording apparatus according to the second embodiment of the present invention. In FIG. 8, a buffer memory 5 temporarily stores data to a storage device 1. A buffer data amount measuring portion 6 measures the amount of the data stored in the buffer memory 5. A buffer memory 7 temporarily stores difference data to the storage device 1. The same reference numerals are assigned to the same constituent elements as those shown in FIG. 1 and hence, the detailed description thereof is omitted.

In the apparatus shown in FIG. 8, the buffer memory 5 and the buffer data amount measuring portion 6 realize the function of the recorded state monitoring portion 4 shown in FIG. 1. That is, when the speed of a recording request from an upper apparatus is more than the recording speed of the storage device 1, data are stored, so that the buffer memory 5 is full of the data. On the other hand, when the speed of the recording request is less than the recording speed of the storage device 1, the stored data are read out, so that the buffer memory 5 is emptied. Therefore, it is possible to know a state where a recording instruction to the storage device 1 is executed by measuring the amount of the data in the buffer memory 5.

The buffer memory 5 also has the function of improving response to the recording request from the upper apparatus and reducing the number of times of overhead. In other words, the buffer memory 5 previously provided in order to reduce the number of times of the overhead can be applied to realizing the function of the recorded state monitoring portion 4 shown in FIG. 1. If the speed of the auxiliary storage device 2 is sufficiently high, the buffer memory 7 need not necessarily be provided.

Description is now made of the outline of operations performed by the apparatus shown in FIG. 8. As described above, in the apparatus shown in FIG. 8, the difference between the required recording speed from the upper apparatus and the effective recording speed of the storage device 1 (see FIG. 2) is detected by the amount of data stored in the buffer memory 5, that is, the amount of the recording instruction which has not been processed. A recording managing portion 3 compares the amount of data measured by the buffer data amount measuring portion 6 and a predetermined reference value (for example, a value corresponding to the capacity of the buffer memory 5), thereby to judge whether or not the recording request from the upper apparatus can be processed by the storage device 1, and issue a recording instruction to the storage device 1 or a recording instruction to the auxiliary storage device 2 in accordance with the result of the judgment. As a result, the difference data which is more than the recording performance of the storage device 1 is recorded on the auxiliary storage device 2.

The recording managing portion 3 further judges whether or not the difference data in the auxiliary storage device 2 can be transferred to the storage device 1 on the basis of the result of the measurement by the buffer data amount measuring portion 6. When the result of the judgment is affirmative, the recording managing portion 3 issues an instruction to transfer the difference data saved in the auxiliary storage device 2 toward the storage device 1. Alternatively, it may judge whether or not the difference data can be transferred on the basis of the state of the recording request from the upper apparatus. The state of the recording request from the upper apparatus is the state of the recording request for each time, for example, the frequency of the recording request, the amount of data recorded on the storage device 1 directly without passing through the auxiliary storage device 2, and a request to close a file during recording (terminate recording), whose details will be described later.

Figure 9:
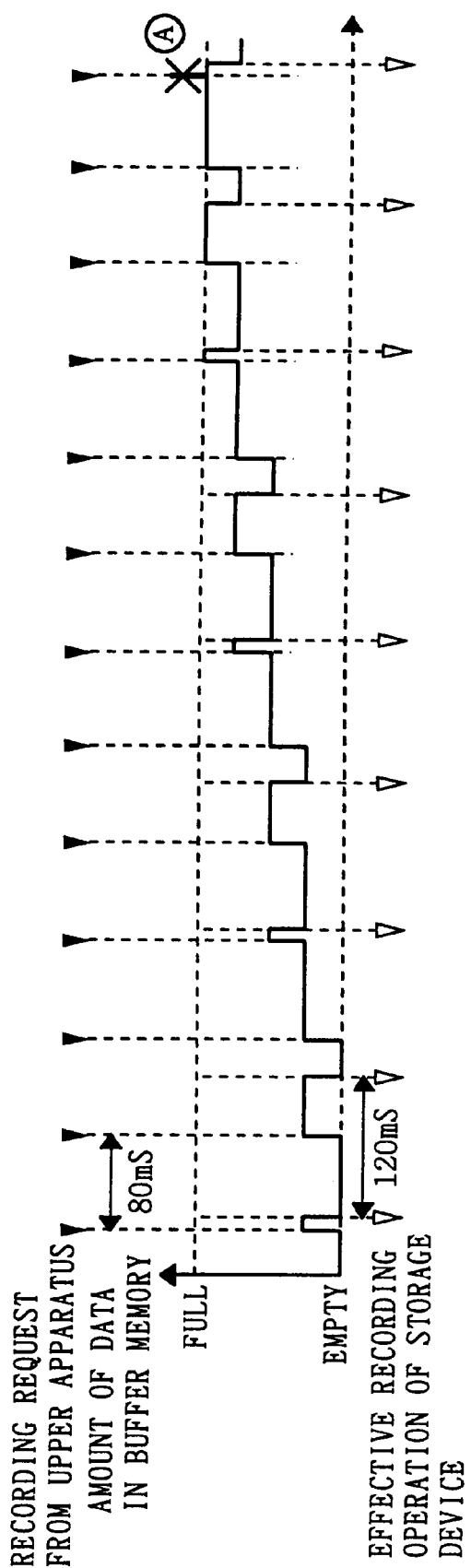
FIG. 9 is a diagram for explaining problems which may arise in a case where if the apparatus shown in FIG. 8 does not comprise a buffer data amount measuring portion 6, a buffer memory 7, and an auxiliary storage device 2, a recording request from an upper apparatus is more than an effective recording operation of a storage device 1.
Figure 10:
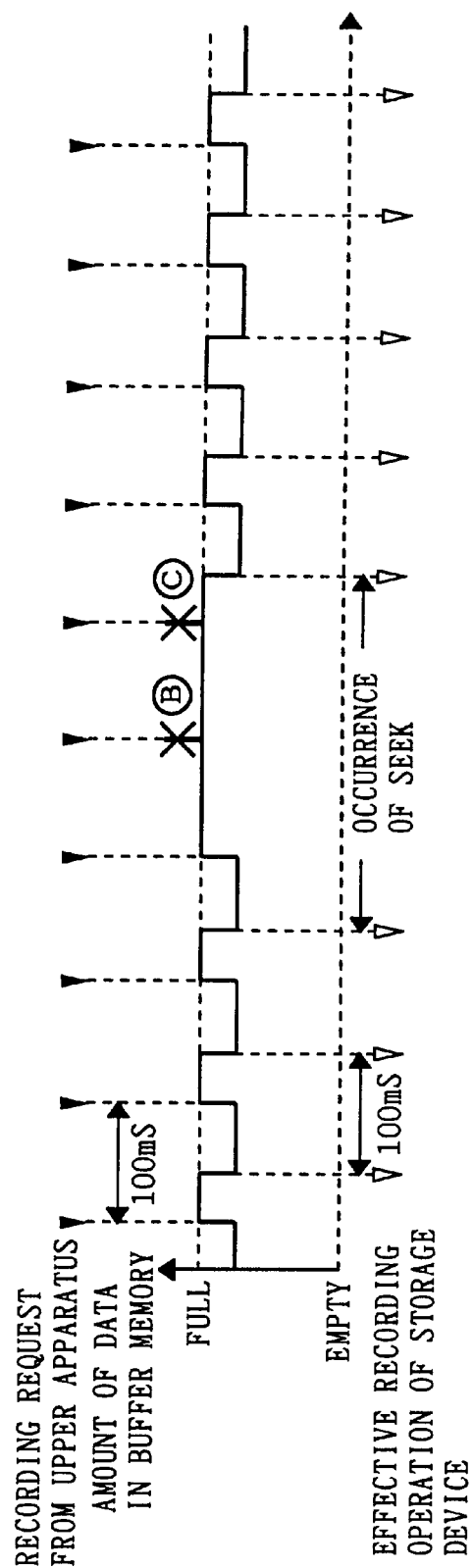
FIG. 10 is a diagram for explaining problems which may arise in a case where if the apparatus shown in FIG. 8 does not comprise a buffer data amount measuring portion 6, a buffer memory 7, and an auxiliary storage device 2, an operation interval of effective recording operations is not kept constant due to seek occurring in a storage device 1.

Referring to FIGS. 9 and 10, problems which may arise if the apparatus shown in FIG. 8 does not comprise the buffer data amount measuring portion 6, the buffer memory 7 and the auxiliary storage device 2 will be described on the basis of the amount of data in the buffer memory 5. The construction of the apparatus shown in FIG. 8 excluding the buffer data amount measuring portion 6, the buffer memory 7 and the auxiliary storage device 2 is the same as that of the conventional apparatus in which the storage device is provided with the buffer memory (see the item "Description of the Background Art").

FIG. 9 is a diagram for explaining problems which may arise when the recording request from the upper apparatus is more than an effective recording operation of the storage device 1 if the apparatus shown in FIG. 8 does not comprise the buffer data amount measuring portion 6, the buffer memory 7 and the auxiliary storage device 2. In FIG. 9, the size of data corresponding to one recording request from the upper apparatus and the size of data corresponding to one effective recording operation of the storage device 1 shall be the same. The buffer memory 5 shall be able to store data whose amount corresponds to four recording instructions. Further, the recording requests from the upper apparatus shall be issued at intervals of 80 milliseconds, and the effective recording operations of the storage device 1 shall be performed at intervals of 120 milliseconds.

In FIG. 9, two effective recording operations are only performed in response to three recording requests, therefore, the amount of data in the buffer memory 5 is gradually increased. The 13-th recording request indicated by A in FIG. 9 is not processed due to the overflow of the buffer memory 5. Consequently, data corresponding to the recording request (indicated by a short solid line directed upward from a position indicated by a broken line indicating that the buffer memory 5 is full of data; the length of the solid line represents the size of data corresponding to the recording request) is not stored in the buffer memory 5. In such a case, some problems arise. For example, in the actual recording apparatus, the upper apparatus is waited for, or the recording request is lost.

FIG. 10 is a diagram for explaining problems which may arise when an interval of effective recording operations is not kept constant because seek occurs in the storage device 1 if the apparatus shown in FIG. 8 does not comprise the buffer data amount measuring portion 6, the buffer memory 7 and the auxiliary storage device 2. Also in FIG. 10, the size of data corresponding to one recording request from the upper apparatus and the size of data corresponding to one effective recording operation of the storage device 1 shall be the same, as in FIG. 9. Both an interval of recording requests from the upper apparatus and an interval of effective recording operations of the storage device 1 shall be 100 milliseconds.

In FIG. 10, the buffer memory 5 is almost full of data before seek occurs. However, the effective recording operations are correctly performed at predetermined intervals. After the third effective recording operation, however, seek occurs, accordingly, the two effective recording operations are not performed. Therefore, two recording requests indicated by B and C in FIG. 10 are not executed because the buffer memory 5 overflows. Consequently, some problems arise, as in the case of FIG. 9. For example, the upper apparatus is waited for, or the recording request is lost. How the problems are solved by the apparatus shown in FIG. 8 will be explained using FIGS. 11 and 12.

Figure 11:
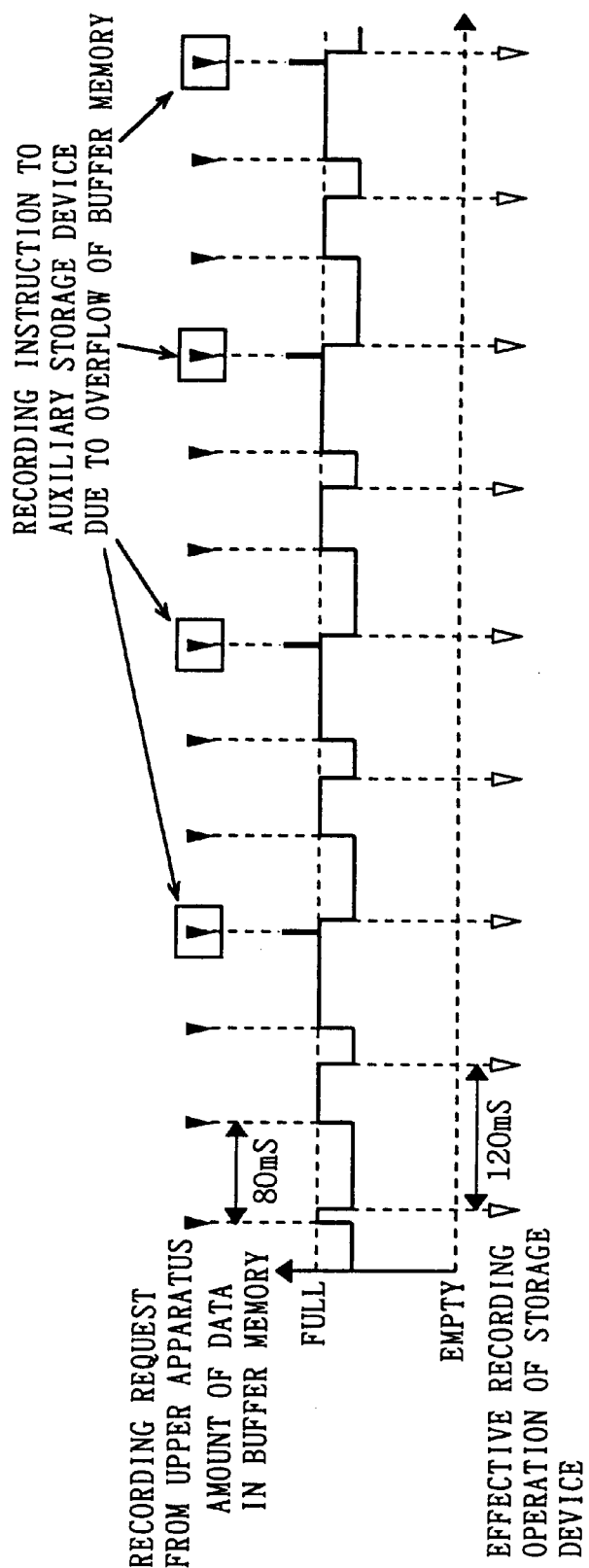
FIG. 11 is a diagram for explaining how the problems shown in FIG. 9 are solved by the apparatus shown in FIG. 8.
Figure 12:
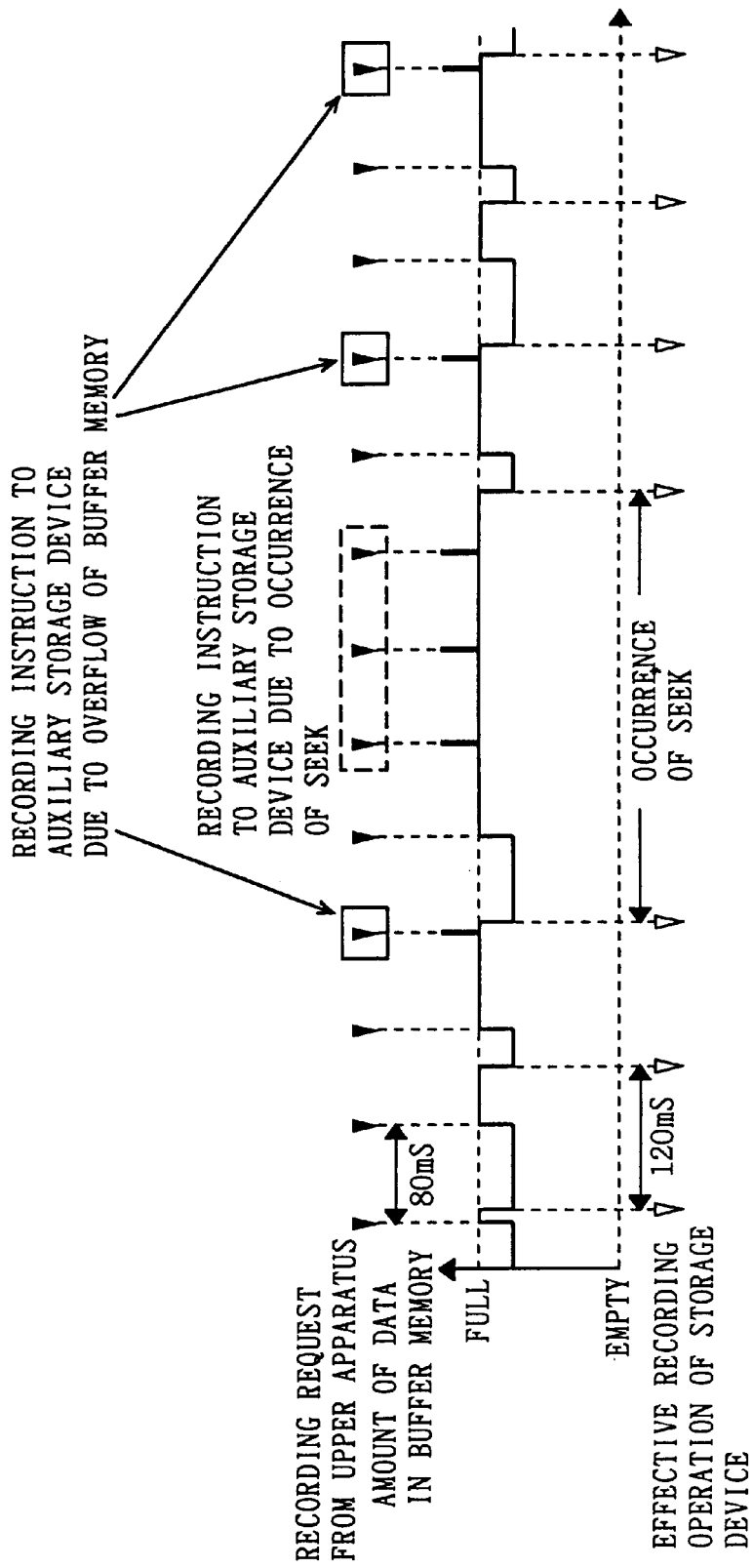
FIG. 12 is a diagram for explaining how the problems shown in FIG. 10 are solved by the apparatus shown in FIG. 8.

FIGS. 11 and 12 are diagram for explaining how the problems shown in FIGS. 9 and 10 are solved by the apparatus shown in FIG. 8. In FIGS. 11 and 12, the size of data corresponding to one recording request from the upper apparatus (solid downward triangular mark "▼") and the size of data corresponding to one effective recording operation of the storage device 1 (hollow downward triangular mark "▽") shall be the same. An interval of the recording requests from the upper apparatus is taken as 80 milliseconds, and an interval of the effective recording operations of the storage device 1 is taken as 120 milliseconds. At this time, two effective recording operations are only performed in response to three recording requests, therefore, the amount of data in the buffer memory 5 is gradually increased. The capacity of the buffer memory 5 is an amount corresponding to four recording requests, as in FIGS. 9 and 10.

In FIG. 11, the fourth recording request in a series of recording requests, and every two recording requests out of the subsequent recording requests (represented by square mark "□") are sent when the amount of data in the buffer memory 5 is a value indicating full. The recording managing portion 3 determines that the recording requests should be processed by the auxiliary storage device 2 in place of the storage device 1, and stores data corresponding to the requests in the buffer memory 7.

In FIG. 12, a recording request represented by "square mark" indicated by a solid line is sent when the amount of data in the buffer memory 5 is a value indicating full, similarly to the recording request indicated by "square mark" shown in FIG. 11. On the other hand, three recording requests enclosed by "square mark" indicated by a dotted line are sent when the buffer memory 5 is full because seek occurs after the third effective recording operation in the storage device 1, then, two effective recording operations are not correctly performed. The recording managing portion 3 determines that the three recording requests enclosed by the "square mark" indicated by the dotted line should be processed by the auxiliary storage device 2 in place of the storage device 1, and stores data corresponding to the requests in the buffer memory 7.

In FIG. 8, when the buffer memory 5 is full, the sent recording request is thus processed by the auxiliary storage device 2 in place of the storage device 1. Consequently, the recording request from the upper apparatus can be accepted, even if the required recording speed from the upper apparatus is more than the effective recording speed of the storage device 1, and seek occurs in the storage device 1. Therefore, the upper apparatus is not waited for, and the recording request is not lost.

Figure 13:
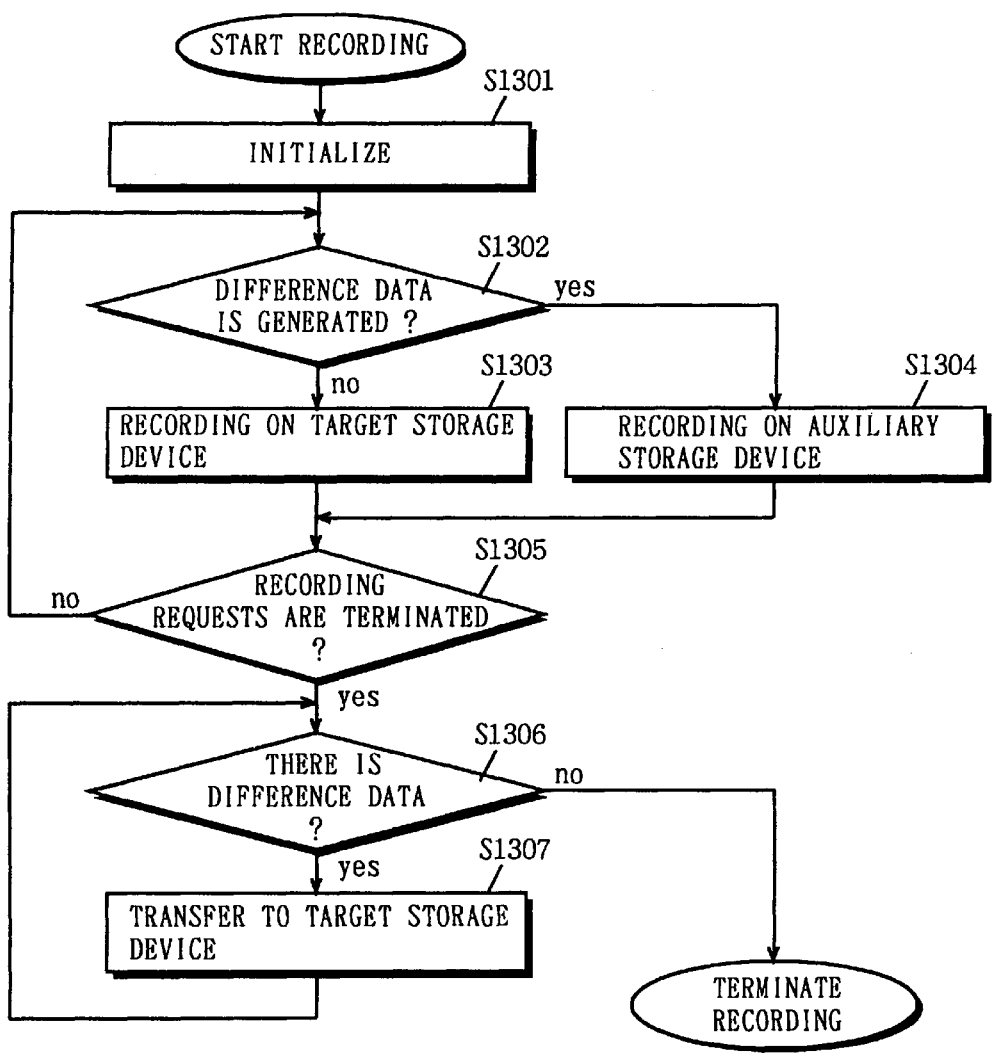
FIG. 13 is a flow chart showing the flow of processing of a recording managing portion 3 in an apparatus shown in FIG. 8 (a second embodiment)

The flow of processing of the recording managing portion 3 in the apparatus shown in FIG. 8 will be described using FIG. 13. That is, FIG. 13 is a flow chart showing the flow of the processing of the recording managing portion 3 in the apparatus shown in FIG. 8. In FIG. 13, the storage device 1 shown in FIG. 8 is described as a target storage device. Difference data saved in the auxiliary storage device 2 is transferred to the storage device 1 at the same time point where a recording request from the upper apparatus is terminated.

In FIG. 13, when a file is opened, to start recording, the recording managing portion 3 initializes management information for recording the difference data on the auxiliary storage device 2 and management information for causing the storage device 1 to handle an incomplete file (step 1301).

The recording managing portion 3 then determines, in response to the recording request from the upper apparatus, whether the current recording request from the upper apparatus is processed by the storage device 1 or the auxiliary storage device 2 (that is, whether or not the difference data is generated) on the basis of the amount of data stored in the buffer memory 5 (that is, the result of measurement by the buffer data amount measuring portion 6) (step S1302). The recording managing portion 3 issues a recording instruction to the storage device (step S1303) when it is determined at the step S1302 that the difference data is not generated, while issuing a recording instruction to the auxiliary storage device 2 (step S1304) when it is determined that the difference data is generated.

The recording managing portion 3 then judges whether or not a series of recording requests from the upper apparatus for a file which is being currently created is terminated (step S1305). As a result of the judgment at the step S1305, when the recording requests have not been terminated yet, the program is returned to the step S1302 and the above-mentioned processing is repeated. When the recording requests are terminated, the program proceeds to the step S1306.

Judgment as to whether or not the difference data is generated at the step S1302 is made by providing a predetermined reference value (a value corresponding to the capacity of the buffer memory 5, for example) and comparing the value with the amount of data in the buffer memory 5. In the example shown in FIG. 11, the capacity of the buffer memory 5 is a value corresponding to four recording requests, so that the reference value is set to four, to generate difference data when the amount of data in the buffer memory 5 is four. It is judged at the step S1305 whether or not the recording request is terminated on the basis of judgment whether or not there is a request to close the file, for example.

The recording managing portion 3 then inspects the auxiliary storage device 2, to examine whether or not there is difference data (step S1306). As a result of the inspection, if there is difference data, a suitable amount of data in the difference data is transferred toward the storage device 1 upon issuing an instruction to the auxiliary storage device 2 (step S1307). Thereafter, the program is returned to the step S1306. If there is no difference data, the recording operation is terminated.

Although in the foregoing description, it is assumed that the size of data corresponding to one recording request from the upper apparatus and the size of data corresponding to one effective recording operation of the storage device 1 are the same, they may differ from each other, in which case the same effect is obtained.

Third Embodiment

A third embodiment of the present invention will be described while referring to the drawings.

The construction of a data recording apparatus according to the present embodiment is the same as that in the second embodiment and hence, FIG. 8 will be also cited in the following description (the data recording apparatus according to the present embodiment is referred to as an apparatus shown in FIG. 8). The present embodiment is characterized in that in the second embodiment, when a recording managing portion 3 starts to issue a recording instruction to an auxiliary storage device 2 such that difference data saved in the auxiliary storage device 2 is not cut into small pieces, the issue is continued for a predetermined time period (operations of constituent elements other than the recording managing portion 3 are the same as those in the second embodiment). Consequently, continuity of the difference data saved in the auxiliary storage device 2 is ensured, so that the difference data can be transferred to the storage device 1 by batch processing from the auxiliary storage device 2, for example. As a result, the processing speed of the data recording apparatus is improved. The details thereof will be described using FIG. 14.

Figure 14:
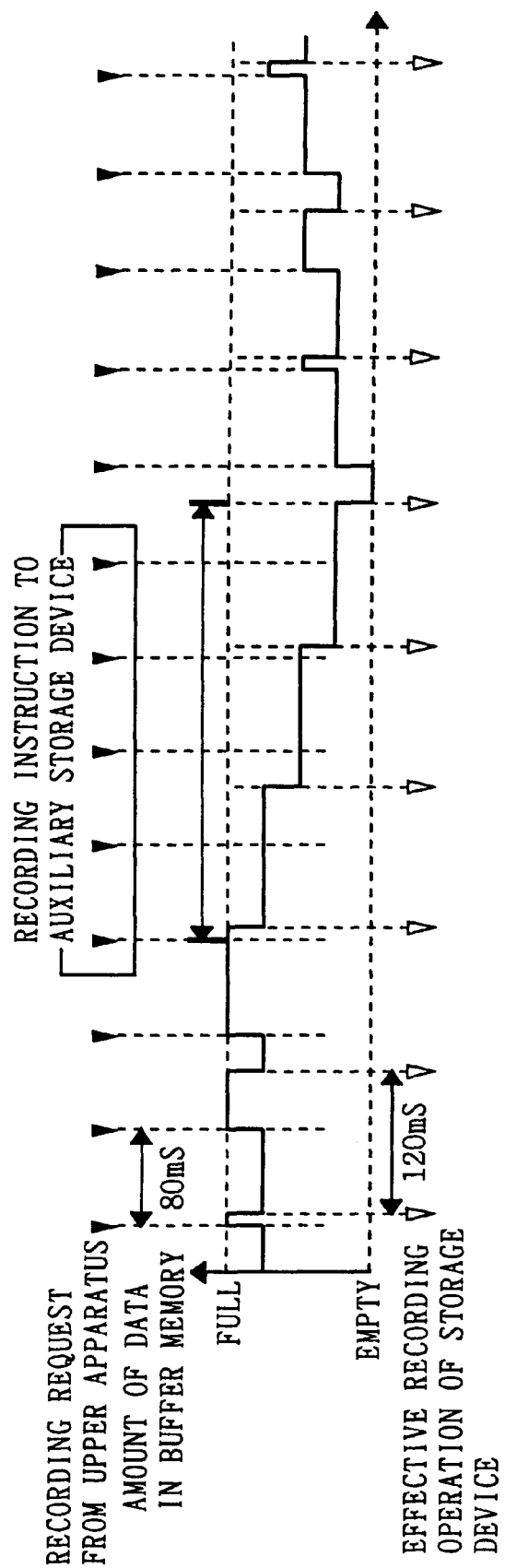
FIG. 14 is a diagram showing how a recording operation of an auxiliary storage device 2 is continued for a predetermined time period such that difference data saved in the auxiliary storage device is not cut into small pieces in the apparatus shown in FIG. 8.

FIG. 14 is a diagram showing how a recording operation of the auxiliary storage device 2 is continued for a predetermined time period such that the difference data saved in the auxiliary storage device 2 is not cut into small pieces. In FIG. 14, the size of data corresponding to one recording request from an upper apparatus (solid downward triangular mark "▼") and the size of data corresponding to one effective recording operation of the storage device 1 (hollow downward triangular mark "▽") shall be the same. An interval of recording requests from the upper apparatus is taken as 80 milliseconds, and an interval of effective recording operations of the storage device 1 is taken as 120 milliseconds. At this time, two effective recording operations are only performed in response to three recording requests, so that the amount of data in a buffer memory 5 is gradually increased. The capacity of the buffer memory 5 is an amount corresponding to four recording requests.

In FIG. 14, the fourth recording request is sent when the amount of the data in the buffer memory 5 is a value indicating full. The recording managing portion 3 determines that the fourth recording request should be processed by the auxiliary storage device 2 in place of the storage device 1, and stores data corresponding to the request in a buffer memory 7. Thereafter, the sent recording requests are successively processed by the auxiliary storage device 2 until the buffer memory 5 is emptied (a total of five recording requests enclosed by "square mark" indicated by a solid line are processed by the auxiliary storage device 2). A suitable reference value may be previously determined, and the recording request may be processed by the auxiliary storage device 2 at the time point where the amount of the data in the buffer memory 5 is not more than the reference value.

Reading from the buffer memory 5 is performed in parallel with writing to the buffer memory 7. The buffer memory 5 is emptied by the sixth effective recording operation of the storage device 1. When the buffer memory 6 is emptied, the recording managing portion 3 determines that the subsequent recording requests should be processed by the storage device 1, and stores data corresponding to the requests in the buffer memory 5.

Figure 15:
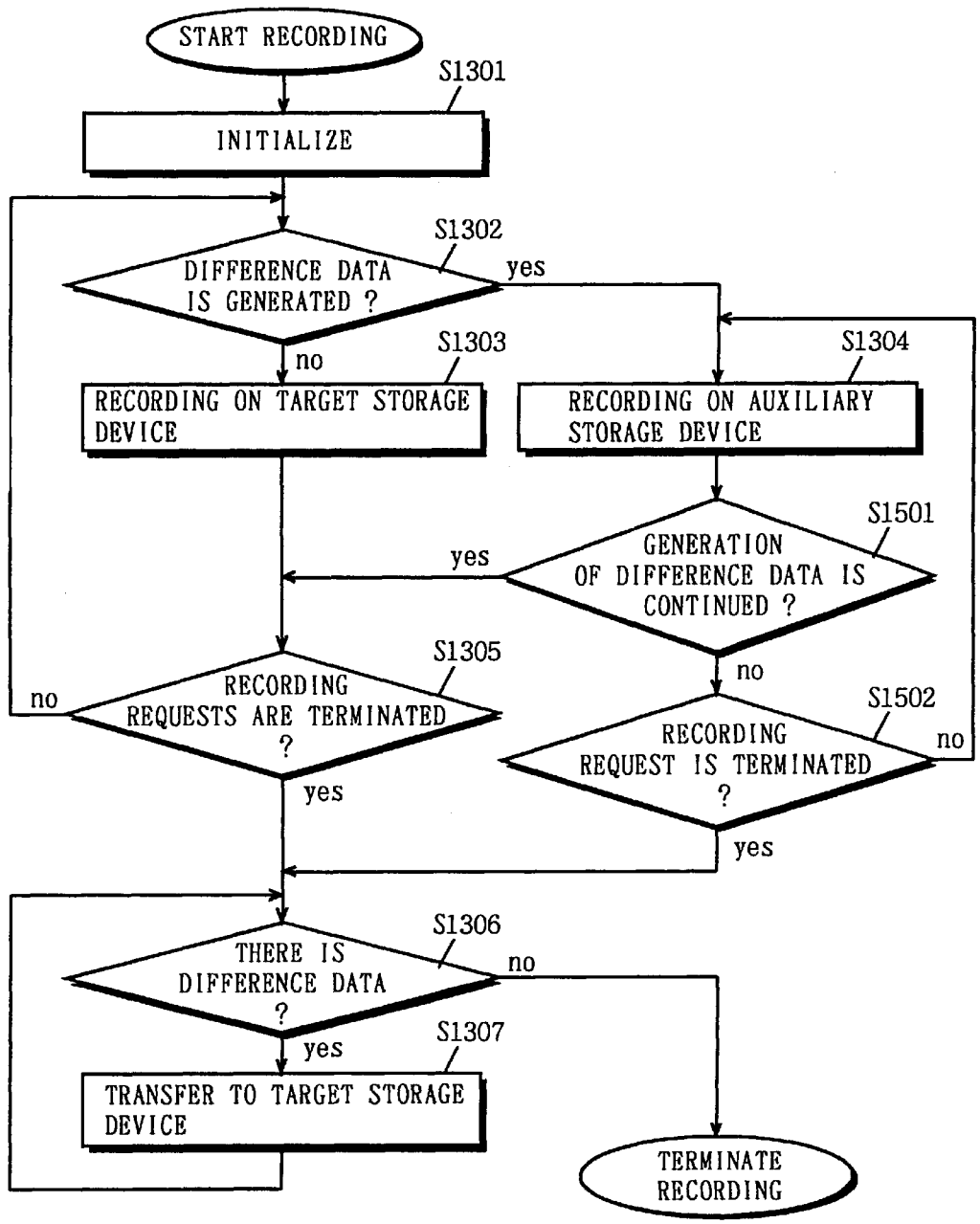
FIG. 15 is a flow chart showing the flow of processing of a recording managing portion 3 in an apparatus shown in FIG. 8 (a third embodiment)

The flow of processing of the recording managing portion 3 in the apparatus shown in FIG. 8 will be described using FIG. 15. That is, FIG. 15 is a flow chart showing the flow of the processing of the recording managing portion 3 in the apparatus shown in FIG. 8. The processing shown in FIG. 15 further comprises the step of judging whether or not the generation of difference data is continued (step S1501), and the step of judging whether or not the recording request from the upper apparatus is terminated (step S1502) in the processing shown in FIG. 13.

In FIG. 15, when a file is opened, to start recording, the recording managing portion 3 initializes management information for recording the difference data on the auxiliary storage device 2 and management information for causing the storage device 1 to handle an incomplete file (step 1301).

The recording managing portion 3 then determines, in response to the recording requests from the upper apparatus, whether the current recording request from the upper apparatus should be processed by the storage device 1 or the auxiliary storage device 2 (that is, whether or not the difference data is generated) on the basis of the amount of the data stored in the buffer memory 5 (that is, the result of measurement by the buffer data amount measuring portion 6) (step S1302). The recording managing portion 3 issues a recording instruction to the storage device 1 (step S1303) when it is determined at the step S1302 that the difference data is not generated, while issuing a recording instruction to the auxiliary storage device 2 when it is determined that the difference data is generated (step S1304).

The recording managing portion 3 then judges whether or not a series of recording requests from the upper apparatus for a file which is being currently created is terminated (step S1305). As a result of the judgment at the step S1305, when the recording requests have not been terminated yet, the program is returned to the step S1302 and the above-mentioned processing is repeated. When the recording requests are terminated, the program proceeds to the step S1306. The above-mentioned processing is the same as that described in the second embodiment.

The third embodiment differs from the second embodiment in the following points. That is, when it is determined at the step S1302 that difference data is generated, the recording managing portion 3 determines whether the current recording request from the upper apparatus is continuously processed by the auxiliary storage device 2 or processed by the storage device 1 (that is, whether or not the generation of the difference data is continued) subsequently to the processing at the step S1304 (step S1501). Specifically, when the data exists in the buffer memory 5, the generation of the difference data is continued. If the buffer memory 5 is empty, the generation of the difference data is stopped. It is then judged whether or not a series of recording requests from the upper apparatus for a file which is being currently created is terminated (step S1502). The program proceeds to the step S1306 when the result of the judgment is affirmative, while being returned to the step S1304 when it is negative.

The recording managing portion 3 then inspects the auxiliary storage device 2, to examine whether or not there is difference data (step S1306), as in the second embodiment. As a result of the inspection, if there is difference data, a suitable amount of data in the difference data is transferred toward the storage device 1 upon issuing an instruction to the auxiliary storage device 2 (step S1307). Thereafter, the program is returned to the step S1306. If there is no difference data, the recording operation is terminated.

Although in the foregoing description, it is assumed that the size of data corresponding to one recording request from the upper apparatus and the size of data corresponding to one effective recording operation of the storage device 1 are the same, they may differ from each other, in which case the same effect is obtained.

At the step S1501 shown in FIG. 15, the recording managing portion 3 detects that the buffer memory 5 is empty, to determine that the generation of the difference data is stopped. Since recording requests are continuously sent in the actual apparatus, however, it cannot, in some cases, be detected that the buffer memory 5 is emptied. Therefore, a suitable reference value may be provided, to detect that the amount of the data in the buffer memory 5 is less than the reference value.

Fourth Embodiment

A fourth embodiment of the present invention will be described while referring to the drawings.

The construction of a data recording apparatus according to the present embodiment is the same as that in the second embodiment and hence, FIG. 8 will be also cited in the following description (the data recording apparatus according to the present embodiment is referred to as an apparatus shown in FIG. 8). In the second embodiment, the recording managing portion 3 does not issue an instruction to transfer difference data saved in the auxiliary storage device 2 until a recording request from the upper apparatus is terminated. On the other hand, the present embodiment is characterized in that a recording managing portion 3 evaluates a state where a recording instruction to a storage device 1 is executed (see the first embodiment) and judges whether or not difference data can be transferred, to issue an instruction to transfer saved difference data when the amount of data written into the storage device 1 directly (without passing through the auxiliary storage device 2) per unit time is not more than a predetermined reference value (operations of constituent elements other than the recording managing portion 3 are the same as those in the second embodiment). Consequently, the data saved in the auxiliary storage device 2 can be transferred toward the storage device 1 more efficiently while preventing the current recording request from the upper apparatus from being executed. The details thereof will be described using FIG. 16.

Figure 16:
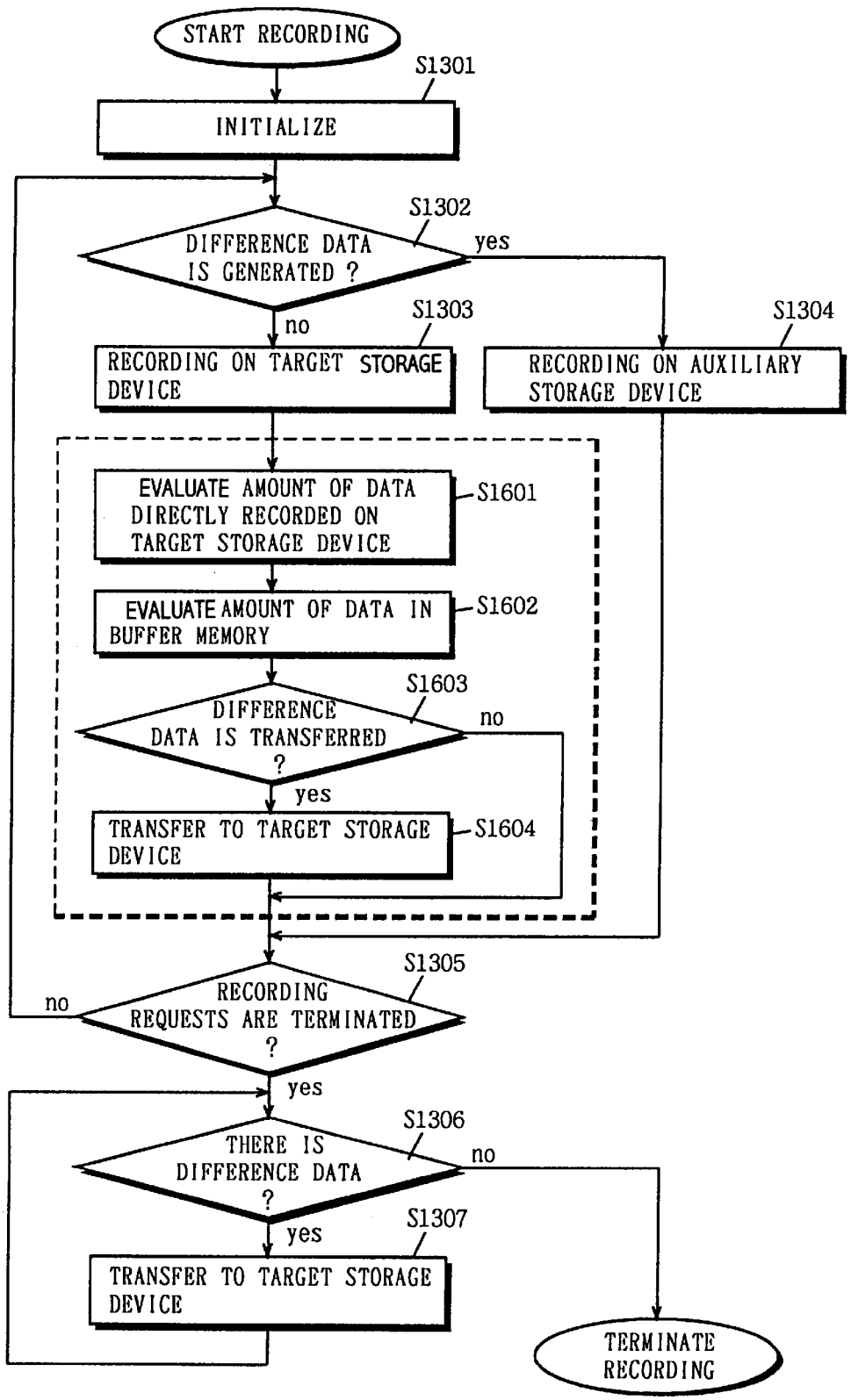
FIG. 16 is a flow chart showing the flow of processing of a recording managing portion 3 in an apparatus shown in FIG. 8 (a fourth embodiment)

FIG. 16 is a flow chart showing the flow of processing of the recording managing portion 3 in the apparatus shown in FIG. 8. The processing shown in FIG. 16 further comprises steps (S1601 to 1604) enclosed by a rectangle indicated by a broken line in the processing shown in FIG. 13. Steps other than the steps S1601 to S1604 are the same as those described in the second embodiment and hence, the description thereof is not repeated.

A recording instruction to the auxiliary storage device 2 is issued at the step S1303, after which the recording managing portion 3 evaluates the amount of data written into the storage device 1 directly without passing through the auxiliary storage device 2 per unit time (hereinafter referred to as direct write speed) (step S1601), and then evaluates the amount of data in a buffer memory 5 (step S1602). It is judged whether or not difference data saved in the auxiliary storage device 2 can be transferred to the storage device 1 on the basis of the result of the evaluation at the steps S1601 and S1602 (step S1603), and issues an instruction to transfer the difference data in the auxiliary storage device 2 to the storage device 1 when the result of the judgment is affirmative (step S1604). When the result of the judgment is negative, the program proceeds to the step S1305.

The judgment at the step S1603 is made in the following manner, for example. That is, a reference value for evaluating the amount of data directly written into the storage device 1 per unit time (2 Mbps in this case) and a reference value for evaluating the amount of data in the buffer memory 5 (128 kilobytes in this case) are previously provided, and respective values obtained by the evaluation at the steps S1601 and S1602 are compared with the reference values. As a result of the comparison, when the direct write speed obtained by the evaluation at the step S1601 is not more than 2 Mbps, and the amount of the data in the buffer memory 5 is not more than 128 kilobytes, it is judged that the difference data can be transferred, then the step S1604 is carried out. When the direct write speed exceeds 2 Mbps, or the amount of data in the buffer memory 5 exceeds 128 kilobytes, the step S1604 is not carried out. The two reference values are set to suitable values in accordance with the recording performance of the storage device 1 and a required recording speed from the upper apparatus.

Fifth Embodiment

A fifth embodiment of the present invention will be described while referring to the drawings.

The construction of a data recording apparatus according to the present embodiment is the same as that in the third embodiment and hence, FIG. 8 will be also cited in the following description (the data recording apparatus according to the present embodiment is referred to as an apparatus shown in FIG. 8). In the third embodiment, the recording managing portion 3 does not issue an instruction to transfer difference data saved in the auxiliary storage device 2 until a recording request from the upper apparatus is terminated. On the other hand, the present embodiment is characterized in that a recording managing portion 3 evaluates a state where a recording instruction to a storage device 1 (see the first embodiment) and judges whether or not difference data can be transferred, to issue an instruction to transfer saved difference data when the result of the judgment is affirmative and the amount of data written into the storage device 1 directly (without passing through the auxiliary storage device 2) per unit time is not more than a predetermined reference value (operations of constituent elements other than the recording managing portion 3 are the same as those in the second embodiment). Consequently, the data saved in the auxiliary storage device 2 can be transferred toward the storage device 1 more efficiently while preventing the current recording request from the upper apparatus from being executed. The details thereof will be described using FIG. 17.

Figure 17:
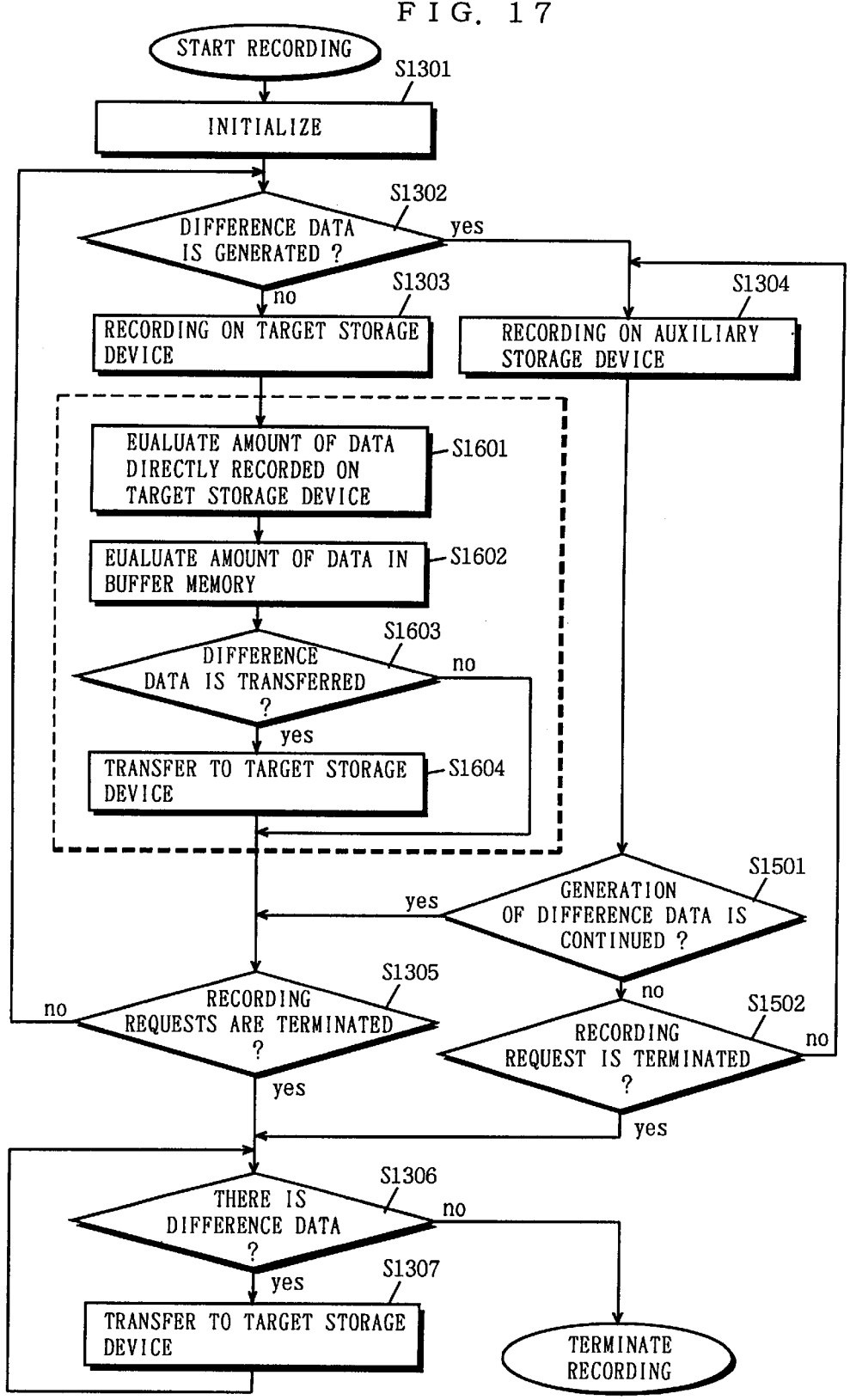
FIG. 17 is a flow chart showing the flow of processing of a recording managing portion 3 in an apparatus shown in FIG. 8 (a fifth embodiment)

FIG. 17 is a flow chart showing the flow of processing of the recording managing portion 3 in the apparatus shown in FIG. 8. The processing shown in FIG. 17 further comprises steps (S1601 to 1604) enclosed by a rectangle indicated by a broken line in the processing shown in FIG. 15. Steps other than the steps S1601 to S1604 are the same as those described in the third embodiment and hence, the description thereof is not repeated. Further, the steps S1601 to S1604 are the same as those described in the fourth embodiment and hence, the description thereof is not repeated.

Sixth Embodiment

A sixth embodiment of the present invention will be described while referring to the drawings.

The construction of a data recording apparatus according to the present embodiment is the same as that in the second embodiment and hence, FIG. 8 will be also cited in the following description (the data recording apparatus according to the present embodiment is referred to as an apparatus shown in FIG. 8). The present embodiment is characterized in that in the second embodiment, each of buffer memories 5 and 7 comprises, in addition to a data buffer part storing data (or its pointer), a position part storing a position (an address) in a file of the data, and a data size part storing the size of the data. Consequently, data at an arbitrary position in the file can be saved in an auxiliary storage device 2 (the buffer memory 7 herein) (that is, a complete file can be created in a storage device 1 after the saved data is transferred). The details thereof will be described using FIG. 18.

FIG. 18 is a diagram showing the structures of the buffer memories 5 and 7 in the apparatus shown in FIG. 8. FIGS. 18(a) and 18(b) respectively illustrate the buffer memory 5 and the buffer memory 7. In FIG. 18, each of entries (entries 0 to N and entries 0 to M+1) in the buffer memories 5 and 7 comprises a data buffer part storing data, a position part storing a position in a file of the data, and a data size part storing the size of the data.

Operations performed by the apparatus shown in FIG. 8 are the same as those described in the second embodiment (see FIG. 13) and hence, the description thereof is not repeated, and only a portion relating to the transfer of saved data will be described in detail. In both FIGS. 18(a) and 18(b), the data buffer part has a previously determined capacity (16384 bytes herein).

In the buffer memory 5, both the position part and the data size part are initialized to zero when recording is started. When the recording is started, data are successively stored in the respective data buffer parts of the entries, starting with the entry 0. In addition, the values of the position part and the data size part are updated. In FIG. 18(a), data which is zero in position at its head and is 16384 bytes in size is stored in the data buffer part of the entry 0, for example.

Similarly, data which is 16384 in position at its head and is 16384 bytes in size is stored in the data buffer part of the entry 1, and data which is 65536 in position at its head and is 16384 bytes in size is stored in the data buffer part of the entry 2. In the entry N, both the position and the data size are zero which is the same as that in its initial state and, therefore, it is found that no effective data is stored in the data buffer part of the entry N.

Since the position is 16384 and the data size is 16384 in the entry 1, the position in the subsequent entry 2 should be 32768. However, the position in the entry 2 is 65536. Therefore, it is found that data composed of 32768 bytes which is 32768 in position at its head is stored in the auxiliary storage device 2.

In the entry K-1, data composed of 6400 bytes which is 1048576 in position as its head is stored. The data size in each of the entries is determined as 16384 bytes. Therefore, the entry in which the data size is smaller than 16384 bytes is limited to an entry storing data at the end of the file. Accordingly, it is found that the data in the entry K-1 is the data at the end of the file.

Data composed of 16384 bytes which is 32768 in position at its head is stored in the subsequent entry K. This is data transferred from the auxiliary storage device 2.

On the other hand, in the buffer memory 7, both the position part and the data size part are initialized to zero when recording is started. When the recording is started, data are successively stored in the respective data buffer parts of the entries, starting with the entry 0. In addition, the values of the position part and the data size part are updated. In FIG. 18(b), data which is 32768 in position at its head and is 16384 bytes in size is stored in the data buffer part of the entry 0, for example.

Similarly, data which is 49152 in position at its head and is 16384 bytes in size is stored in the data buffer part of the entry 1. In the entry M+1, both the position and the data size are zero and, therefore, it is found that no effective data is stored in the data buffer part of the entry M+1. Consequently, the last entry storing the effective data is the entry M. Data composed of 16384 bytes which is 1032192 in position at its head is stored in the entry M.

At the time of transferring data from the auxiliary storage device 2 to the storage device 1, a data main body, a position and a data size are copied on the buffer memory 5 from the auxiliary storage device 2 in units of entries. On the side of the auxiliary storage device 2, there is a case where all of a data main body, a position and a data size are recorded on the auxiliary storage device 2 through the buffer memory 7 and a case where only a data main body is recorded on the auxiliary storage device 2 through the buffer memory 7, while a position and a data size are stored in the buffer memory 7. Accordingly, in the former case, the data main body, the position and the data size are copied on the buffer memory 5 from the auxiliary storage device 2. In the latter case, the position and the data size are read out of the buffer memory 7 and are copied on the buffer memory 5, while the data main body is read out of the auxiliary storage device 2 and is copied on the buffer memory 5. In either case, on the side of the storage device 1, the data main body is recorded using the position and the data size which are written into the buffer memory 5.

Although in the above-mentioned description, the buffer memory 5 is described as a one-dimensional buffer in which the last entry N has not been used yet, it may be an FIFO (First-in First-out) memory or a ring buffer, for example.

Seventh Embodiment

A seventh embodiment of the present invention will be described while referring to the drawings.

The construction of a data recording apparatus according to the present embodiment is the same as that in the sixth embodiment and hence, FIG. 8 will also be cited in the following description (the data recording apparatus according to the present embodiment is referred to as an apparatus shown in FIG. 8). The present embodiment is the same as the sixth embodiment (see FIG. 18) in the structures of buffer memories 5 and 7, and differs from the sixth embodiment in that the position of data saved in an auxiliary storage device 2 is stored in the buffer memory 5. The details thereof will be described using FIGS. 19 and 20.

FIG. 19 is a diagram (corresponding to FIG. 18(a)) showing an example of the contents of a position part and a data size part in the buffer memory 5 in the apparatus shown in FIG. 8. In FIG. 19, positions (32768 and 49152) and data sizes (both are zero) of data saved in the auxiliary storage device 2 are respectively stored in entries 2 and 3.

As shown in FIG. 19, the data size 0 is stored in the data size part in the buffer memory 5, so that a storage device 1 can know that data composed of 32768 bytes which is 32768 in position at its head is saved in the auxiliary storage device 2. The reason for this is that data composed of 1 to 16384 bytes is generally stored in the data buffer part of each of the entries, so that the data size cannot be zero.

Even in an entry which does not store data, for example, an entry N shown in FIG. 18(a), the data size is zero, so that the entry which does not store data and an entry indicating that data is saved (entries 2 and 3 in FIG. 19) may be confused with each other. In the entry which does not store data, however, the position is always zero. On the other hand, in the entry indicating that data is saved, the position is not zero. The reason for this is that data at the head of a file is not saved in the auxiliary storage device 2 in principle. Consequently, the entry which does not store data and the entry indicating that data is saved are definitely distinguished.

In a method shown in FIG. 19, in order to notify the storage device 1 that data composed of 32768 bytes which is 32768 in position at its head is saved in the auxiliary storage device 2, the continuous two entries (the entries 2 and 3) are used, accordingly, the efficiency is low as a buffer. In a notifying method shown in FIG. 20, the same notification as that shown in FIG. 19 can be made by one entry.

Figure 20:
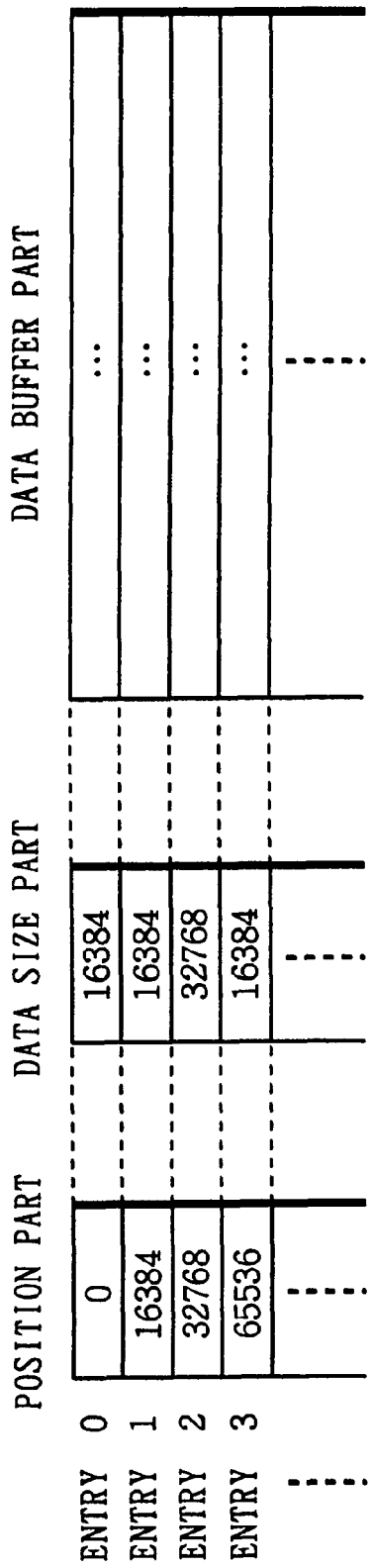
FIG. 20 is a diagram (corresponding to FIG. 18(a)) showing another example of the contents of a position part and a data size part in a buffer memory 5 in an apparatus shown in FIG. 8 (a seventh embodiment)

FIG. 20 is a diagram (corresponding to FIG. 18(a)) showing another example of the contents of a position part and a data size part in the buffer memory 5 in the apparatus shown in FIG. 8 In FIG. 20, a position (32768) and a data size (32768) of data saved in the auxiliary storage device 2 are stored in an entry 2.

As shown in FIG. 20, the data size 32768 is stored in the data size part in the buffer memory 5, so that a storage device 1 can know that data composed of 32768 bytes which is 32768 in position at its head is saved in the auxiliary storage device 2. The reason for this is that data composed of 1 to 16384 bytes is generally stored in the data buffer part of each of the entries, so that the data size cannot be 32768.

In creating a file, to ensure continuity of data in the file has a large effect of preventing the performance of a file system from being degraded. When difference data saved in the auxiliary storage device 2 is transferred to the storage device 1, the storage device 1 can previously ensure, by notifying, at the time point where data is recorded on the auxiliary storage device 2 as described above, the storage device 1 of the position of the data, the position where the data is stored. As a result, it is possible to easily ensure continuity between the data and data preceding and succeeding the data. Contrary to this, in the sixth embodiment, in transferring difference data saved in the auxiliary storage device 2 to the storage device 1, entries preceding and succeeding the data must be referred to in order to obtain the position at the head of the data and the amount of the data, therefore, the processing is a heavy burden.

Although in the foregoing description, the buffer memory 5 is described as a one-dimensional buffer in which the last entry N has not been used yet, it may be an FIFO memory or a ring buffer, for example.

Eighth Embodiment

An eighth embodiment of the present invention will be described while referring to the drawings.

The construction of a data recording apparatus according to the present embodiment is the same as that in the sixth embodiment and hence, FIG. 8 will also be cited in the following description (the data recording apparatus according to the present embodiment is hereinafter referred to as an apparatus shown in FIG. 8). The present embodiment is characterized in that in the sixth embodiment, each of buffer memories 5 and 7 further comprises an allocation part storing allocation, in a storage device 1, of difference data saved in an auxiliary storage device 2.

In a data recording apparatus (and method) in which a part of data in a file is recorded on the auxiliary storage device 2, as proposed in the present invention, the timing at which the position where the difference data recorded on the auxiliary storage device 2 is stored on a storage device 1 is allocated may be either (1) the timing at which the fact that recording on the auxiliary storage device 2 is made is transmitted explicitly or implicitly from the recording managing portion 3 to the storage device 1 through the buffer memory 5 or (2) the timing at which the difference data is transferred from the auxiliary storage device 2 to the storage device 1. As described in the seventh embodiment, however, it is preferable to perform the allocation at the timing (1) in order to ensure the position where the difference data is stored in consideration of continuity of the data in the file in the storage device 1.

When the allocation is performed at the timing (1), however, it is necessary to record, after scanning position information (hereinafter referred to as allocation) in the storage device 1 to confirm the position of a storage area once again at the timing (2) at which data is actually transferred, the transferred data. Since digital AV data particularly used as an object in the present invention is very huge, it is impossible to ignore overhead occurring when the allocation is scanned. The present embodiment solves this problem.

FIG. 21 is a diagram showing the structures of the buffer memories 5 and 7 in the apparatus shown in FIG. 8. FIGS. 21(a) and 21(b) respectively illustrate the buffer memory 5 and the buffer memory 7. In FIG. 21, each of entries (entries 0 to N and entries 0 to M+1) in the buffer memories 5 and 7 comprises a data buffer part storing data, a position part storing a position in a file of the data, a data size part storing the size of the data, and an allocation part storing allocation, in the storage device 1, of difference data saved in the auxiliary storage device 2. With respect to data directly written into the storage device 1, zero is stored in the allocation part. The data buffer part has a previously determined capacity (16384 bytes herein).

Operations performed by the apparatus shown in FIG. 8 are the same as those described in the sixth embodiment (see FIG. 13) and hence, the description thereof is not repeated, and only a portion relating to the transfer of saved data will be described in detail. In both FIGS. 21(a) and 21(b), the data buffer part has a previously determined capacity (16384 bytes herein).

In the buffer memory 5, both the position part and the data size part are initialized to zero when recording is started. When the recording is started, data are successively stored in the respective data buffer parts of the entries, starting with the entry 0. In addition, the values of the position part and the data size part are updated. In FIG. 21(a), data which is zero in position at its head and is 16384 bytes in data size is stored in the data buffer part of the entry 0.

Similarly, data which is 16384 in position at its head and is 16384 bytes in size is stored in the data buffer part of the entry 1, and data which is 65536in position at its head and is 16384 bytes in size is stored in the data buffer part of the entry 2. Since the position is 16384 and the data size is 16384 in the entry 1, the position in the subsequent entry 2 should be 32768. However, the position in the entry 2 is 65536. Therefore, it is found that data composed of 32768bytes which is 32768 in position at its head is stored in the auxiliary storage device 2.

The storage device 1 detects as described above that data composed of 32768 bytes which is 32768 in position at its head is saved in the auxiliary storage device 2, ensures allocation, on the storage device 1, of the saved data at the time point, and stores the value in the allocation part in the buffer memory 7 (FIG. 21(*b*)). The storage device 1 can easily access the allocation part in the buffer memory 7 if it holds a base address of a table storing allocation and information indicating how many entries are there before an entry in which the data is saved from the head of the file.

In the entry K-1, data composed of 6400 bytes which is 1048576 in position at its head is stored. The data size in each of the entries is determined as 16384 bytes. Therefore, the entry in which the data size is smaller than 16384 bytes is limited to an entry storing data at the end of the file. Accordingly, it is found that the data in the entry K-1 is the data at the end of the file. Zero is stored in the allocation parts of the entries.

Data composed of 16384 bytes which is 32768in position at its head is stored in the subsequent entry K. This is data transferred from the auxiliary storage device 2. In the allocation part of the entry K, the value of the corresponding allocation part in the buffer memory 7 (FIG. 21(*b*)) is stored upon being copied.

In the entry N-1, data composed of 16384 bytes which is 1032192 in position at its head is stored. The data is also data transferred from the auxiliary storage device 2. In the allocation part of the entry N-1, the value of the corresponding allocation part in the buffer memory 7 (FIG. 21(*b*)) is stored upon being copied.

On the other hand, in the buffer memory 7, both the position part and the data size part are initialized to zero when recording is started. When the recording is started, data are successively stored in the respective data buffer parts of the entries, starting with the entry 0. In addition, the values of the position part and the data size part are updated. In FIG. 21(*b*), data which is 32768 in position at its head and is 16384 bytes in size is stored in the data buffer part of the entry 0, for example.

The last entry storing the effective data is the entry M. Data composed of 16384 bytes which is 1032192 in position at its head is stored in the entry M. Allocation, on the storage device 1, which is ensured in the storage device 1 when it is detected that difference data is saved in the auxiliary storage device 2 is written into the allocation part of each of the entries 0 to M.

At the time of transferring data from the auxiliary storage device 2 to the storage device 1, a data main body, a position, a data size, and allocation are copied on the buffer memory 5 from the buffer memory 7 in units of entries. On the side of the storage device 1, the data main body is recorded using the position, the data size, and the allocation which are written into the buffer memory 5.

Ninth Embodiment

A ninth embodiment of the present invention will be described while referring to the drawings.

The construction of a data recording apparatus according to the present embodiment is the same as that in the sixth embodiment and hence, FIG. 8 will be also cited in the following description (the data recording apparatus according to the present embodiment is hereinafter referred to as an apparatus shown in FIG. 8). The present embodiment is characterized in that in the sixth embodiment, each of buffer memories 5 and 7 further comprises a file ID part storing an identifier of a file. Consequently, the apparatus shown in FIG. 8 can simultaneously handle a plurality of files without providing a buffer memory (5) for each file. The details thereof will be described using FIG. 22.

FIG. 22 is a diagram showing the structure of a buffer memory 5 in the apparatus shown in FIG. 8. In FIG. 22, each of entries in the buffer memory 5 comprises a data buffer part storing data, a position part storing a position in a file of the data, a data size part storing the size of the data, and a file ID part storing an identifier (ID) of the file. The data buffer part has a previously determined capacity (16384 bytes herein).

The buffer memory 5 can store data in a plurality of different files (two files having IDs of 0 and 1 in FIG. 22) by comprising the file ID part. The procedure for writing of data into the buffer memory 5 will be described every two files having IDs of 0 and 1.

Description is now made of the file having an ID of 0. In FIG. 22, data composed of 16384 bytes which is zero in position at its head and data composed of 16384 bytes which is 16384 in position at its head are respectively stored in an entry 0 and an entry 1. Data composed of 16384 bytes which is 2080768 in position at its head, data composed of 16384 bytes which is 2097152 in position at its head, and data composed of 16384 bytes which is 2113536 in position at its head are respectively stored in an entry S, an entry S+2, and an entry S+3.

Data composed of 10240 bytes which is 3145728 in position at its head is stored in an entry T+1. The size of the data is smaller than 16384, therefore, it is found that the data is at the end of the file having an ID of 0.

Data composed of 16384 bytes which is 32768 in position at its head and data composed of 16384 bytes which is 49152 in position at its head are respectively stored in an entry T+2 and an entry T+4. These entries are entries for transferring difference data.

Description is now made of the file having an ID of 1. In FIG. 22, data composed of 16384 bytes which is zero in position at its head and data composed of 16384 bytes which is 16384 in position at its head are respectively stored in an entry S+1 and an entry S+4. The data of the file having an ID of 1 are successively stored in entries among the entries storing the data of the file having an ID of 0. That is, data composed of 16384 bytes which is 1310720 in position at its head and data composed of 16384 bytes which is 1441792 in position at its head are respectively stored in an entry T and an entry T+3. Data are also similarly stored in the subsequent entries.

On the other hand, consider a case where a buffer memory 5 is provided for each file. If the number of files increases, a lot of buffer memories 5 are required in proportion thereto. Moreover, the amount of data must be measured for each buffer memory 5 and generically evaluated, therefore, processing is complicated and the scale of the data recording apparatus is increased.

Each of the above-mentioned embodiments may be realized by dedicated hardware or realized in a software manner by executing a program in a computer. In the latter case, the program may be provided with it being stored in a portable recording medium such as a floppy disk or a CD-ROM, or may be supplied through a communication line.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data recording apparatus for recording data continuously fed, comprising:

first storing means for storing the data;

second storing means in a parallel relation with said first storing means for recording a part of the data;

recording managing means for issuing a recording instruction to said first storing means and a recording instruction to said second storing means while mutually switching the recording instructions in accordance with a proceeding of the data feed;

recorded state monitoring means for monitoring a state where the recording instruction to said first storing means issued by said recording managing means is executed;

said recording managing means determining which of the recording instruction to said first storing means and the recording instruction to said second storing means should be issued on the basis of the result of the monitoring by said recorded state monitoring means when the recording instruction to said first storing means and the recording instruction to said second storing means are issued while being switched.

2. The data recording apparatus according to claim 1, wherein:

said recording managing means further issues a transfer instruction to transfer the data recorded on said second storing means toward said first storing means on the basis of the result of the monitoring by said recorded state monitoring means.

3. The data recording apparatus according to claim 2, wherein:

said first storing means ensures, when it detects that the data is recorded on said second storing means, an area for recording, when the data is transferred, the data, creates a table related to the data, and stores in the table position information in the ensured area.

4. The data recording apparatus according to claim 2, wherein:

said recording managing means issues the transfer instruction when there is no new recording request and the result of the monitoring by said recorded state monitoring means satisfies the second condition.

5. The data recording apparatus according to claim 2, wherein:

said recording managing means judges whether or not the amount of data written into the first storing means directly without passing through said second storing means within a predetermined time period is not more than a third reference value, to issue said transfer instruction when the result of the judgment is affirmative, and the result of the monitoring by said recorded state monitoring means satisfies the second condition.

6. The data recording apparatus according to claim 1, wherein:

said recorded state monitoring means comprises:

a buffer memory for temporarily storing the data to be written into said first storing means; and buffer data amount measuring means for measuring the amount of the data stored in said buffer memory;

said recording managing means judges whether or not the result of the measurement by said buffer data amount measuring means is not more than a first reference value, to issue the recording instruction to said first storing means when the result of the judgment is affirmative, while issuing the recording instruction to said second storing means when it is negative.

7. The data recording apparatus according to claim 6, wherein:

said recording managing means further judges whether or not the result of the measurement by said buffer data amount measuring means is not more than a second reference value when the recording instruction to said second storing means is issued, to continuously issue the recording instruction to said second storing means until the result of the judgment is affirmative.

8. The data recording apparatus according to claim 6, wherein:

said buffer memory stores, in addition to the data, the size of the data and the position thereof in a file.

9. The data recording apparatus according to claim 8, wherein:

said buffer memory further stores an identifier of the file.

10. The data recording apparatus according to claim 8, wherein:

said buffer memory further stores, when the data recorded on said second storing means is transferred, position information in an area of said first storing means for recording the data.

11. The data recording apparatus according to claim 8, wherein:

said buffer memory stores, when it stores the size of the data, sizes other than sizes which can be actually taken, thereby notifying said first storing means that recording on said second storing means is made.

12. A data recording method carried out in a data recording apparatus comprising first and second storing means for recording data continuously fed, said method comprising:

issuing a recording instruction to the first storing means and a recording instruction to the second storing means while mutually switching the recording instructions in accordance with a proceeding of the data feed;

recording on the second recording means a part of the data to be recorded on the first storing means;

monitoring a state where the recording instruction to the first storing means is executed; and determining which of the recording instruction to the first storing means and the recording instruction to the second storing means should be issued on the basis of the result of said monitoring when the recording instruction to the first storing means and the recording instruction to the second storing means are issued while being switched.

13. The data recording method according to claim 12, further comprising:

issuing a transfer instruction to transfer the data recorded on the second storing means toward the first storing means on the basis of the result of said monitoring.

14. The data recording method according to claim 13, further comprising:

when it is detected that the data is recorded on the second storing means;

ensuring an area for recording the data when the data is transferred to the first storing means, creating a table related to the data, and storing position information in the ensured area in the table.

15. The data recording method according to claim 13, further comprising:

issuing the transfer instruction when there is no new recording request and the result of said monitoring satisfies the second condition.

16. The data recording method according to claim 13, further comprising:

judging whether or not the amount of data written into the first storing means directly without passing through the second storing means within a predetermined time period is not more than a third reference value, to issue the transfer instruction when the result of said judgment is affirmative and the result of said monitoring satisfies the second condition.

17. The data recording method according to claim 12, further comprising:

in said monitoring a state where the recording instruction to the first storing means is executed;

temporarily storing the data to be written into the first storing means; and measuring the amount-of the stored data; and in said determining which of the recording instruction to the first storing means and the recording instruction to the second storing means should be issued;

judging whether or not the result of said measurement is not more than a first reference value; and issuing the recording instruction to the first storing means when the result of said judgment is affirmative, while issuing the recording instruction to the second storing means when it is negative.

18. The data recording method according to claim 17, further comprising:

in said issuing the recording instruction to the second storing means;

judging whether or not the result of said measurement is not more than a second reference value; and continuously issuing the recording instruction to the second storing means until the result of the judgment is affirmative.

19. The data recording method according to claim 17, further comprising:

in said temporarily storing the data to be written into the first storing means;

storing, in addition to the data, the size of the data and the position thereof in a file.

20. The data recording method according to claim 19, further comprising:

in said temporarily storing the data to be written into the first storing means;

storing an identifier of the file.

21. The data recording method according to claim 19, further comprising:

in said temporarily storing the data to be written into the first storing means;

storing, when the data recorded on the second storing means is transferred, position information in an area of the first storing means for recording the data.

22. The data recording method according to claim 19, further comprising:

in said storing the size of the data to be written into the first storing means;

storing sizes other than sizes which can be actually taken, thereby notifying the first storing means that recording on the second storing means is made.

23. A recording medium executed in a data recording apparatus comprising first and second storing means and having a program for recording data continuously fed recorded thereon, wherein the program realizes on said data recording apparatus an operational environment comprising:

issuing a recording instruction to the first storing means and a recording instruction to the second storing means while mutually switching the recording instructions in accordance with a proceeding of the data feed;

recording on the second storing means a part of the data to be recorded on the first storing means;

monitoring a state where the recording instruction to the first storing means is executed; and determining which of the recording instruction to the first storing means and the recording instruction to the second storing means should be issued on the basis of the result of said monitoring when the recording instruction to the first storing means and the recording instruction to the second storing means are issued while being switched.

24. The recording medium according to claim 23, wherein:

the program realizes on the data recording apparatus the operational environment by further comprising:

issuing a transfer instruction to transfer data recorded on the second storing means toward the first storing means on the basis of the result of said monitoring.

25. The recording medium according to claim 24, wherein:

the program realizes on the data recording apparatus the operational environment by further comprising:

when it is detected that the data is recorded on the second storing means;

ensuring an area for recording the data when the data is transferred to the first storing means, creating a table related to the data, and storing position information in the ensured area in the table.

26. The recording medium according to claim 24, wherein:

the program realizes on the data recording apparatus the operational environment by further comprising:

issuing the transfer instruction when there is no new recording request, and the result of said monitoring satisfies the second condition.

27. The recording medium according to claim 24, wherein:

the program realizes on the data recording apparatus the operational environment by further comprising:

judging whether or not the amount of data written into the first storing means directly without passing through the second storing means within a predetermined time period is not more than a third reference value, to issue the transfer instruction when the result of said judgment is affirmative, and the result of said monitoring satisfies the second condition.

28. The recording medium according to claim 23, wherein:

the program realizes on the data recording apparatus the operational environment characterized by further comprising:

in said monitoring a state where the recording instruction to the first storing means is executed;

temporarily storing said data to be written into the first storing means; and measuring the amount of the stored data; and in said determining which of the recording instruction to the first storing means and the recording instruction to the second storing means should be issued;

judging whether or not the result of said measurement is not more than a first reference value; and issuing the recording instruction to the first storing means when the result of said judgment is affirmative, while issuing the recording instruction to the second storing means when it is negative.

29. The recording medium according to claim 28, wherein:

the program realizes on the data recording apparatus the operational environment by further comprising:
in said issuing the recording instruction to the second storing means;
judging whether or not the result of said measurement is not more than a second reference value; and
continuously issuing the recording instruction to the second storing means until said result of the judgment is affirmative.

30. The recording medium according to claim 28, wherein:

the program realizes on the data recording apparatus the operational environment by further comprising,
in said temporarily storing the data to be written into the first storing means;
storing, in addition to the data, the size of the data and the position thereof in a file.

31. The recording medium according to claim 30, wherein:

the program realizes on the data recording apparatus the operational environment by further comprising:
in said temporarily storing the data to be written into the first storing means;
storing an identifier of the file.

32. The recording medium according to claim 30, wherein:

the program realizes on the data recording apparatus the an operational environment by further comprising:
in said temporarily storing said data to be written into the first storing means;
storing, when the data recorded on the second storing means is transferred, position information in an area of the first storing means for recording the data.

33. The recording medium according to claim 30, wherein:

the program realizes on the data recording apparatus the operational environment by further comprising:
in said storing the size of said data to be written into the first storing means;
storing sizes other than sizes which can be actually taken, thereby notifying the first storing means that recording on the second storing means is made.

* * * * *